(12) United States Patent
Bujnowski et al.

(10) Patent No.: US 11,271,765 B2
(45) Date of Patent: Mar. 8, 2022

(54) DEVICE AND METHOD FOR ADAPTIVELY PROVIDING MEETING

(71) Applicant: Samsung Electronics Co., Ltd., Suwon-si (KR)

(72) Inventors: Pawel Bujnowski, Warsaw (PL); Hee Sik Jeon, Yongin-si (KR); Krzysztof Kazimierz Wilkosz, Wroclaw (PL); Joanna Ewa Marhula, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 16/479,904

(22) PCT Filed: Jan. 19, 2018

(86) PCT No.: PCT/KR2018/000876
§ 371 (c)(1),
(2) Date: Jul. 22, 2019

(87) PCT Pub. No.: WO2018/135892
PCT Pub. Date: Jul. 26, 2018

(65) Prior Publication Data
US 2019/0394057 A1  Dec. 26, 2019

(30) Foreign Application Priority Data

Jan. 20, 2017  (KR) .................. 10-2017-0009603

(51) Int. Cl.
*H04L 12/18* (2006.01)
*G10L 17/00* (2013.01)

(52) U.S. Cl.
CPC .......... *H04L 12/1827* (2013.01); *G10L 17/00* (2013.01); *H04L 12/1822* (2013.01)

(58) Field of Classification Search
CPC . H04L 12/1827; H04L 12/1822; H04L 12/18; G10L 17/00; G06Q 10/109;
(Continued)

(56) References Cited

U.S. PATENT DOCUMENTS

| 6,820,055 B2 | 11/2004 | Saindon et al. |
| 7,679,518 B1 | 3/2010 | Pabla et al. |

(Continued)

FOREIGN PATENT DOCUMENTS

| JP | 2011-061450 A | 3/2011 |
| JP | 2011-081504 A | 4/2011 |
| KR | 10-1999-0060724 A | 7/1999 |

OTHER PUBLICATIONS

ISA/KR, "International Search Report and Written Opinion of the International Searching Authority," International Application No. PCT/KR2018/000876, dated Apr. 20, 2018, 11 pages.
(Continued)

*Primary Examiner* — Soe Hlaing

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to various embodiments of the disclosure, a device for adaptively providing a meeting can comprise at least one processor, which: allocates a first resource for a first user and a second resource for a second user on the basis of first information on the first user and second information on the second user; acquires third information on the first user through at least a portion of the
(Continued)

allocated first resource; and is configured so as to control the first resource and the second resource on the basis of the acquired third information and the second information. The first resource and the second resource are resources for the meeting, and each piece of the first information, the second information, and the third information can include at least one piece of sound information, image information, or environment information of a corresponding user.

20 Claims, 12 Drawing Sheets

(58) Field of Classification Search
    CPC ........ G06Q 10/06; G06Q 10/10; G06Q 50/30;
                                H04W 4/00; G06F 40/10
    See application file for complete search history.

(56) References Cited

U.S. PATENT DOCUMENTS

| | | | |
|---|---|---|---|
| 8,214,748 | B2 | 7/2012 | Srikanth et al. |
| 8,606,579 | B2 | 12/2013 | Rasmussen |
| 8,786,597 | B2 | 7/2014 | Doganata et al. |
| 9,077,849 | B2 | 7/2015 | Meek |
| 9,111,263 | B2 | 8/2015 | Li et al. |
| 2006/0224430 | A1 | 10/2006 | Butt |
| 2009/0271438 | A1 | 10/2009 | Agapi et al. |
| 2010/0149302 | A1 | 6/2010 | Malik |
| 2010/0318399 | A1* | 12/2010 | Li ............... G06Q 10/1093 705/7.18 |
| 2011/0112835 | A1 | 5/2011 | Shinnishi et al. |
| 2012/0140681 | A1* | 6/2012 | Kaminsky ......... H04L 65/403 370/261 |
| 2012/0166242 | A1 | 6/2012 | Bentley et al. |
| 2013/0007635 | A1 | 1/2013 | Michaelis et al. |
| 2013/0018952 | A1 | 1/2013 | McConnell et al. |
| 2013/0254279 | A1 | 9/2013 | Bentley et al. |
| 2013/0325972 | A1 | 12/2013 | Boston et al. |
| 2014/0082100 | A1 | 3/2014 | Sammon et al. |
| 2014/0106721 | A1 | 4/2014 | Calman et al. |
| 2014/0114895 | A1 | 4/2014 | Beechum et al. |
| 2014/0258413 | A1* | 9/2014 | Brieskorn ........... H04N 7/152 709/204 |
| 2015/0154291 | A1 | 6/2015 | Shepherd et al. |
| 2015/0350603 | A1 | 12/2015 | Assem Aly Salama et al. |
| 2016/0284354 | A1 | 9/2016 | Chen et al. |

OTHER PUBLICATIONS

Johansson, Martin, et al., "Opportunities and Obligations to Take Turns in Collaborative Multi-Party Human-Robot Interaction," Proceedings of the SIGDIAL 2015 Conference, Prague, Czech Republic, Sep. 2-4, 2015, 10 pages.
Kim, Seokhwan, et al., "Toward Improving Dialogue Topic Tracking Performances with Wikification of Concept Mentions," Proceedings of the SIGDIAL 2015 Conference, Prague, Czech Republic, Sep. 2-4, 2015, 5 pages.
Mnih, Volodymyr, et al., "Playing Atari with Deep Reinforcement Learning," NIPS Deep Learning Workshop 2013, Dec. 19, 2013, 9 pages.
Moynihan, Tim, "This Toy Dinosaur Uses IBM's Watson as a Brain," Gear, Aug. 5, 2015, 2 pages.
Richardson, Fred, et al., "Deep Neural Network Approaches to Speaker and Language Recognition," IEEE Signal Processing Letters, vol. 22, No. 10, Oct. 2015, 5 pages.
Skantze, Gabriel, et al., "Modelling situated human-robot interaction using IrisTK," Proceedings of the SIGDIAL 2015 Conference, Prague, Czech Republic, Sep. 2-4, 2015, 3 pages.
Socher, Richard, et al., "Semi-Supervised Recursive Autoencoders for Predicting Sentiment Distributions," Proceedings of the 2011 Conference on Empirical Methods in Natural Language Processing, Edinburgh, UK, Jul. 27-31, 2011, 11 pages.
Traum, David, et al., "Evaluating Spoken Dialogue Processing for Time-Offset Interaction," Proceedings of the SIGDIAL 2015 Conference, Prague, Czech Republic, Sep. 2-4, 2015, 10 pages.
Wen, Tsung-Hsien, et al., "Stochastic Language Generation in Dialogue using Recurrent Neural Networks with Convolutional Sentence Reranking," Proceedings of the SIGDIAL 2015 Conference, Prague, Czech Republic, Sep. 2-4, 2015, 10 pages.
Williams, Jason D., et al., "Fast and easy language understanding for dialog systems with Microsoft Language Understanding Intelligent Service (LUIS)," Proceedings of the SIGDIAL 2015 Conference, Prague, Czech Republic, Sep. 2-4, 2015, 3 pages.
Wilcock, Graham, et al., "Multilingual WikiTalk: Wikipedia-based talking robots that switch languages," Proceedings of the SIGDIAL 2015 Conference, Prague, Czech Republic, Sep. 2-4, 2015, 3 pages.
Young, Steve, et al., "POMDP-based Statistical Spoken Dialogue Systems: a Review," Proceedings IEEE, vol. X, No. X, Jan. 2012, 18 pages.
Yu, Zhou, et al., "Incremental Coordination: Attention-Centric Speech Production in a Physically Situated Conversational Agent," Proceedings of the SIGDIAL 2015 Conference, Prague, Czech Republic, Sep. 2-4, 2015, 5 pages.
Zhao, Tiancheng, et al., "An Incremental Turn-Taking Model with Active System Barge-in for Spoken Dialog Systems," Proceedings of the SIGDIAL 2015 Conference, Prague, Czech Republic, Sep. 2-4, 2015, 9 pages.
Supplementary European Search Report in connection with European Application No. 18741396.8 dated Jan. 8, 2020, 5 pages.
Intellectual Propoerty India, "Examination report under sections 12 & 13 of the Patents Act, 1970 and the Patents Rules, 2003" dated Mar. 26, 2021, in connection with Indian Patent Application No. 201927033025, 6 pages.
European Patent Office, "Communication pursuant to Article 94(3) EPC" dated May 17, 2021, in connection with European Patent Application No. EP18741396.8, 4 pages.
Communication pursuant to Article 94(3) EPC dated Jun. 18, 2021 in connection with European Patent Application No. 18 741 396.8, 7 pages.
Notice of Preliminary Rejection dated Jan. 24, 2022, in connection with Korean Application No. 10-2017-0009603, 27 pages.

\* cited by examiner

DEVICE AND METHOD FOR ADAPTIVELY PROVIDING MEETING

CROSS-REFERENCE TO RELATED APPLICATIONS

This application is a 371 National Stage of International Application No. PCT/KR2018/000876, filed Jan. 19, 2018, which claims priority to Korean Patent Application No. 10-2017-0009603, filed Jan. 20, 2017, the disclosures of which are herein incorporated by reference in their entirety.

BACKGROUND

1. Field

The disclosure generally relates to a technique for adaptively providing a meeting and, more specifically, to a device and a method for adaptively providing a meeting through information personalized for each user.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the development of a smart office environment has brought about the proliferation of electronic devices for efficiently conducting a meeting. Participants in such a meeting operate a meeting environment using the electronic devices, as an example of smart works. In general, a meeting environment using the electronic devices is provided according to predetermined input, and it is difficult to adaptively change the meeting environment during the meeting. This difficulty in adaptively changing the meeting environment may cause problems such as omission of a subject, imbalance in talk time between participants, and the like. There is a need for a solution for adaptively allocating resources in order for the participants to conduct a meeting in an optimized environment.

SUMMARY

Based on the above discussion, the disclosure provides a device and a method for adaptively providing a meeting.

The disclosure also provides a device and a method for adaptively providing a meeting by judging the emotional state of a user.

In addition, the disclosure provides a device and a method for adaptively providing a meeting by judging the characteristics of a user.

In addition, the disclosure provides a device and a method for adaptively providing a meeting by judging the intentions of a user.

In addition, the disclosure provides a device and a method for adaptively providing a meeting by judging the environment in which a user is located.

In addition, the disclosure provides a device and a method for adaptively allocating a meeting time for each participant through participant information.

Further, the disclosure provides users with additional information related to the meeting to be conducted through participant information.

According to various embodiments of the disclosure, a method of operating a device for adaptively providing a meeting may include: based on first information about a first user and second information about a second user, allocating a first resource to the first user and a second resource to the second user; obtaining third information about the first user through at least some of the allocated first resource; and based on the obtained third information and the second information, adjusting the first resource and the second resource, wherein the first resource and the second resource are intended for the meeting, and wherein each of the first information, the second information, and the third information includes at least one piece of sound information, image information, and environment information about a corresponding user.

According to various embodiments of the disclosure, a device for adaptively providing a meeting may include: an output unit configured to provide a user with allocated resources; and at least one processor configured to, based on first information about a first user and second information about a second user, allocate a first resource to the first user and a second resource to the second user, obtain third information about the first user through at least some of the allocated first resource, and, based on the obtained third information and the second information, adjust the first resource and the second resource, wherein the first resource and the second resource are intended for the meeting, and wherein each of the first information, the second information, and the third information includes at least one piece of sound information, image information, and environment information about a corresponding user.

A device and a method according to various embodiments of the disclosure can provide users with an environment suitable for conducting a meeting using user-specific information.

A device and a method according to various embodiments of the disclosure can provide users with an efficient meeting by adaptively providing the meeting.

Effects which can be acquired by the disclosure are not limited to the above described effects, and other effects that have not been mentioned may be clearly understood by those skilled in the art from the following description.

DETAILED DESCRIPTION

Figure 1:
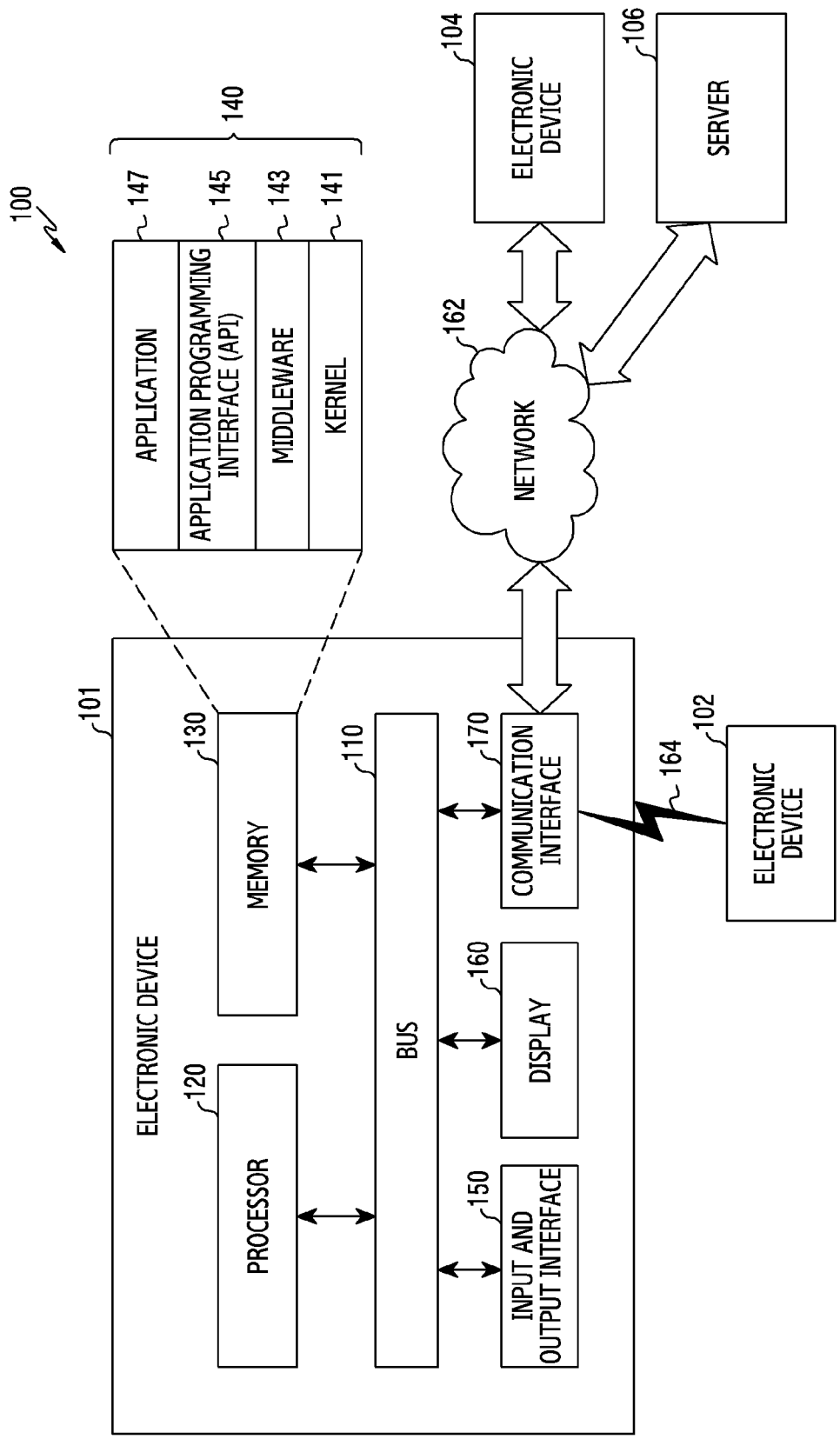
FIG. 1 illustrates a network environment including an electronic device according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. According to an embodiment of the disclosure, the electronic devices are not limited to those described above. In the disclosure, the term "user" may indicate a person using an electronic device or a device (e.g., an artificial intelligence electronic device) using an electronic device.

FIG. 1 illustrates a network environment including an electronic device according to various embodiments of the disclosure.

Referring to FIG. 1, the electronic device 101 may include a bus 110, a processor 120, a memory 130, an input/output interface 150, a display 160, and a communication interface 170. In some embodiments, the electronic device 101 may exclude one or more elements, or may add other elements thereto.

The bus 110 may include a circuit for connecting the elements 110 to 170 to each other and transmitting communications (e.g., control messages or data) between the elements. The processor 120 may include at least one of a central processing unit, an application processor, or a communication processor (CP). The processor 120, for example, may perform calculation or data processing in relation to control and/or communication of one or more other elements of the electronic device 101.

The memory 130 may include a volatile and/or non-volatile memory. For example, the memory 130 may store commands or data in relation to one or more other elements of the electronic device 101. According to an embodiment, the memory 130 may store software and/or programs 140. For example, the programs 140 may include a kernel 141, middleware 143, an application programming interface (API) 145, and/or application programs (or "applications") 147. At least some of the kernel 141, the middleware 143, or the API 145 may be referred to as an "operating system". The kernel 141, for example, may control or manage system resources (e.g., the bus 110, the processor 120, or the memory 130) used to execute operations or functions that are implemented in other programs (e.g., the middleware 143, the API 145, or the application programs 147). In addition, the kernel 141 may provide an interface that allows the middleware 143, the API 145, or the application programs 147 to access respective elements of the electronic device 101 for control or management of system resources.

The middleware 143, for example, may play an intermediate role between the API 145 or the application programs 147 and the kernel 141 to communicate with each other for the transmission and reception of data. In addition, the middleware 143 may process one or more operation requests received from the application programs 147 according to priority thereof. For example, the middleware 143 may give priority for using system resources (e.g., the bus 110, the processor 120, or the memory 130) of the electronic device 101 to at least one of the application programs 147, thereby processing the one or more operation requests. The API 145 may be an interface by which the applications 147 control the functions provided by the kernel 141 or the middleware 143, and, for example, may include one or more interfaces or functions (e.g., instructions) for file control, window control, image processing, or text control. The input/output interface 150, for example, may transfer commands or data received from a user or other external devices to other elements of the electronic device 101, or may output commands or data received from other elements of the electronic device 101 to the user or the other external devices.

The display 160, for example, may include a liquid crystal display (LCD), a light-emitting diode (LED) display, an organic light-emitting diode (OLED) display, a micro-electromechanical system (MEMS) display, or an electronic paper display. For example, the display 160 may display a variety of content (e.g., text, images, videos, icons, symbols, and/or the like) to the user. The display 160 may include a touch screen, and may receive a touch input, a gesture input, a proximity input, or a hovering input using electronic pens or a user's body part. The communication interface 170, for example, may establish communication between the electronic device 101 and external devices (e.g., a first external electronic device 102, a second external electronic device 104, or a server 106). For example, the communication interface 170 may be connected to a network 162 through wireless communication or wired communication for communication with the external devices (e.g., the second external electronic device 104 or the server 106).

For example, the wireless communication may include cellular communication that uses at least one of LTE, LTE-A (LTE Advance), CDMA (code division multiple access), WCDMA (wideband CDMA), UMTS (universal mobile telecommunications system), WiBro (Wireless Broadband), GSM (global system for mobile communications), or the like. According to an embodiment, the wireless communication may include at least one of, for example, WiFi (wireless fidelity), Bluetooth, Bluetooth low energy (BLE), Zigbee, NFC (near field communication), magnetic secure transmission, radio frequency (RF), or a body area network (BAN). According to an embodiment, the wireless communication may include a GNSS. The GNSS, for example, may be a GPS (global positioning system), a Glonsass (global navigation satellite system), a Beidou navigation satellite system (hereinafter, "Beidou"), Galileo, or the European global satellite-based navigation system. Hereinafter, "GPS" may be used interchangeably with "GNSS" in this specification. For example, the wired communication may include at least one of a USB (universal serial bus), an HDMI (high definition multimedia interface), RS-232 (recommended standard 232), power line communication, a POTS (plain old telephone service), or the like. The network 162 may include at least one of telecommunication networks, such as a computer network (e.g., LAN or WAN), the Internet, or a telephone network.

The first external electronic device 102 and the second external electronic device 104 may be the same as, or different from, the electronic device 101, respectively, as to the type thereof. According to various embodiments, at least all or some of the operations executed in the electronic device 101 may be executed by one or more other electronic devices (e.g., the electronic device 102, the electronic device 104, or the server 106). According to an embodiment, in the case where the electronic device 101 executes specific functions or services automatically or upon request, the electronic device 101 may make a request to the other devices (e.g., the electronic device 102, the electronic device 104, or the server 106) for at least some of the functions or services in addition to, or instead of, executing the same by itself. The other electronic devices (e.g., the electronic device 102, the electronic device 104, or the server 106) may execute the requested functions or additional functions, and may transfer the results thereof to the electronic device 101. The electronic device 101 may provide the requested function or service by providing the received result without change or by further processing the same. To this end, for example, cloud computing, distributed computing, or client-server computing technology may be used.

Figure 2:
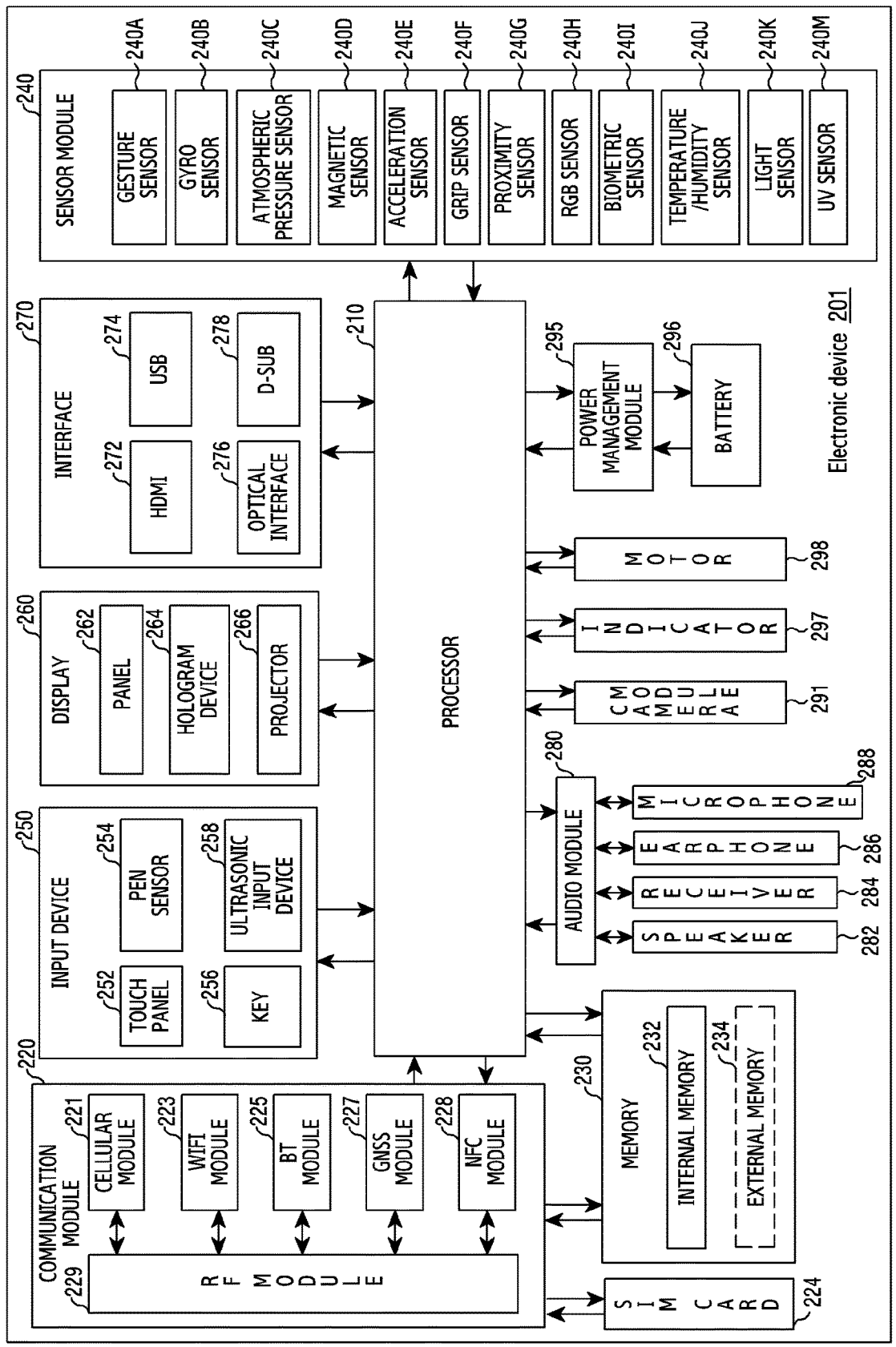
FIG. 2 is a block diagram of an electronic device according to various embodiments of the disclosure.

FIG. 2 is a block diagram of an electronic device according to various embodiments of the disclosure. The electronic device 201, for example, may include all or some of the elements of the electronic device 101 shown in FIG. 1.

Referring to FIG. 2, the electronic device 201 may include at least one processor (e.g., the AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210, for example, may control a multitude of hardware or software elements connected to the processor 210, and may perform processing of a variety of data and calculation by executing an operating system or application programs. The processor 210 may be implemented by, for example, an SoC (system on chip). According to an embodiment, the processor 210 may further include a GPU (graphic processing unit) and/or an image signal processor. The processor 210 may include at least some (e.g., a cellular module 221) of the elements shown in FIG. 2. The processor 210 may load commands or data received from at least one of other elements (e.g., a non-volatile memory) into a volatile memory, thereby processing the same, and may store the resultant data in a non-volatile memory. In various embodiments, the processor 210 may perform a judgement operation. The processor 210 may execute an algorithm to perform the judgement operation. The algorithm may include a learning algorithm such as a convolutional neural network (CNN), a recurrent neural network (RNN), a deep neural network (DNN), and the like. The processor 210 may learn events that have occurred, judgements that have been made, information that has been collected or input, and the like through the algorithm. The processor 210 may store the results of learning in the memory.

The communication module 220 may have a configuration that is the same as or similar to that of the communication interface 170 shown in FIG. 1. The communication module 220, for example, may include a cellular module 221, a WiFi module 223, a Bluetooth module 225, a GNSS module 227, an NFC module 228, and an RF module 229. The cellular module 221, for example, may provide services of voice calls, video calls, text messaging, or the Internet through communication networks. According to an embodiment, the cellular module 221 may perform identification and verification of the electronic device 201 in communication networks using the subscriber identification module (e.g., a SIM card) 224. According to an embodiment, the cellular module 221 may perform at least some of the functions provided by the processor 210. According to an embodiment, the cellular module 221 may include a communication processor (CP). According to an embodiment, at least some (e.g., two or more) of the cellular module 221, the WiFi module 223, the Bluetooth module 225, the GNSS module 227, or the NFC module 228 may be included in a single integrated chip (IC) or a single IC package. The RF module 229 may transmit and receive communication signals (e.g., RF signals). The RF module 229 may include, for example, a transceiver, a PAM (power amp module), a frequency filter, a low-noise amplifier (LNA), antennas, or the like. According to another embodiment, at least one of the cellular module 221, the WiFi module 223, the Bluetooth module 225, the GNSS module 227, or the NFC module 228 may transmit and receive RF signals through a separate RF module. The subscriber identification module 224, for example, may include a card having a subscriber identification module or an embedded SIM, and may contain specific identification information (e.g., an ICCID (integrated circuit card identifier)) or subscriber information (e.g., an IMSI (international mobile subscriber identity)).

The memory 230 (e.g., the memory 130) may include an internal memory 232 or an external memory 234. The internal memory 232, for example, may include at least one of a volatile memory (e.g., a DRAM, an SRAM, an SDRAM, or the like) or a non-volatile memory (e.g., an OTPROM (one time programmable ROM), a PROM, an EPROM, an EEPROM, a mask ROM, a flash ROM, a flash memory, a hard drive, a solid state drive (SSD), or the like). The external memory 234 may include a flash drive, and, for example, may include CF (compact flash), SD (secure digital), Micro-SD, Mini-SD, xD (extreme digital), an MMC (multi-media card), a memory stick, or the like. The external memory 234 may be functionally or physically connected with the electronic device 201 through any of various interfaces. In various embodiments, the memory 230 may store learning results through the learning-algorithm operation of the processor 210. Specifically, the memory 230 may establish a database (DB) containing the learning results analyzed and generated by the processor 210 during the meeting on the basis of probabilities or statistics. The database may be referred to as a "pattern database".

The sensor module 240 may, for example, measure physical quantities, or may detect the state of operation of the electronic device 201, thereby converting the measured or detected information into electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an RGB (red, green, and blue) sensor), a biometric sensor 240I, a temperature/humidity sensor 240J, an illuminance sensor 240K, or a UV (ultra-violet) sensor 240M. Alternatively or additionally, the sensor module 240, for example, may further include an e-nose sensor, an electromyography (EMG) sensor, an electroencephalogram (EEG) sensor, an electrocardiogram (ECG) sensor, an IR (infrared) sensor, an iris sensor, and/or a fingerprint sensor. The sensor module 240 may further include a control circuit for controlling one or more sensors included therein. In some embodiments, the electronic device 201 may further include a processor as a part of the processor 210 or separately from the processor 210, which is configured to control the sensor module 240, thereby controlling the sensor module 240 while the processor 210 is in a sleep mode. In various embodiments, the sensor module 240 may judge the motion of a specific body part of a participant (e.g., a head, hands, eyes, or the like) in the meeting, or may recognize a gesture of the participant. In addition, the sensor module 240 may measure the temperature, humidity, illuminance, and atmospheric pressure of the environment in which the meeting is conducted (e.g., a meeting room). The sensor module 240 may transmit the recognition and measurement results to the processor 210.

The input device 250, for example, may include a touch panel 252, a (digital) pen sensor 254, keys 256, or an ultrasonic input device 258. The touch panel 252 may be implemented using at least one of, for example, a capacitive type, a pressure-sensitive type, an infrared type, or an ultrasonic type. In addition, the touch panel 252 may further include a control circuit. The touch panel 252 may further include a tactile layer, thereby providing a user with a tactile reaction. For example, the (digital) pen sensor 254 may be a part of the touch panel, or may include a separate recognition sheet. The keys 256 may include, for example, physical buttons, optical keys, or a keypad. The ultrasonic input device 258 may detect ultrasonic waves that are generated in the input means through a microphone (e.g., a microphone 288), thereby identifying data corresponding to the ultrasonic waves.

The display 260 (e.g., the display 160) may include a panel 262, a hologram device 264, a projector 266, and/or a control circuit for controlling the same. The panel 262 may be implemented to be, for example, flexible, transparent, or wearable. The panel 262 may be configured as one or more modules together with the touch panel 252. According to an embodiment, the panel 262 may include a pressure sensor (or a force sensor) capable of measuring the intensity of pressure of a user's touch. The pressure sensor may be implemented to be integral with the touch panel 252, or may be implemented as one or more sensors separately from the touch panel 252. The hologram device 264 may display 3D images in the air using light interference. The projector 266 may display images by projecting light onto a screen. The screen may be positioned, for example, inside or outside the electronic device 201. The interface 270 may include, for example, at least one of an HDMI 272, a USB 274, an optical interface 276, or a D-sub (D-subminiature) 278. The interface 270 may be included in, for example, the communication interface 170 shown in FIG. 1. Additionally or alternatively, the interface 270 may include, for example, an MHL (mobile high-definition link) interface, an SD card/MMC (multi-media card) interface, or an IrDA (infrared data association) standard interface.

The audio module 280, for example, may convert a sound into an electric signal, and vice versa. At least some elements of the audio module 280 may be included, for example, in the input/output interface 150 shown in FIG. 1. For example, the audio module 280 may process voice information that is input or output through a speaker 282, a receiver 284, earphones 286, or a microphone 288. In various embodiments, the audio module 280 may include a natural-language module. The natural-language module may perform natural language processing (NLP). Specifically, the natural-language module may generate a natural language for text recognized from an electric signal {e.g., natural-language generation (NLG)}, or may recognize a natural language of a sound {e.g., natural-language understanding (NLU)}. The camera module 291, for example, may be a device for taking still and moving pictures, and, according to an embodiment, may include one or more image sensors (e.g., a front sensor or a rear sensor), lenses, an image signal processor (ISP), or a flash (e.g., an LED or a xenon lamp). According to an embodiment, the camera module 291 may be a 3-dimensional (3D) camera for recognizing respective participants. In various embodiments, the camera module may take moving pictures of participants, or may take images of participants. The power management module 295, for example, may manage the power of the electronic device 201. According to an embodiment, the power management module 295 may include a PMIC (power management integrated circuit), a charger integrated circuit (IC), or a battery or fuel gauge. The PMIC may be implemented as a wired charging type and/or a wireless charging type. The wireless charging type may encompass, for example, a magnetic resonance type, a magnetic induction type, or an electromagnetic wave type, and may further include additional circuits for wireless charging, such as coil loops, resonance circuits, or rectifiers. The battery gauge may measure, for example, the remaining power of the battery 296 and a charging voltage, current, or temperature. The battery 296 may include, for example, a rechargeable battery and/or a solar battery.

The indicator 297 may display the specific state of the electronic device 201 or a part (e.g., the processor 210) thereof, such as a booting state, a message state, or a charging state. The motor 298 may convert an electric signal to a mechanical vibration, and may provide a vibration or a haptic effect. The electronic device 201 may include a device (e.g., a GPU) for supporting mobile TV, which may process media data according to standards such as DMB (digital multimedia broadcasting), DVB (digital video broadcasting), mediaFlo™, or the like. The respective elements described in this document may include one or more components, and the names of the corresponding elements may be varied depending on the type of electronic device. In various embodiments, the electronic device 201 may exclude some elements, or may include additional elements, or some of the elements may be combined into a single entity that performs the same functions as those of the original elements.

Figure 3:
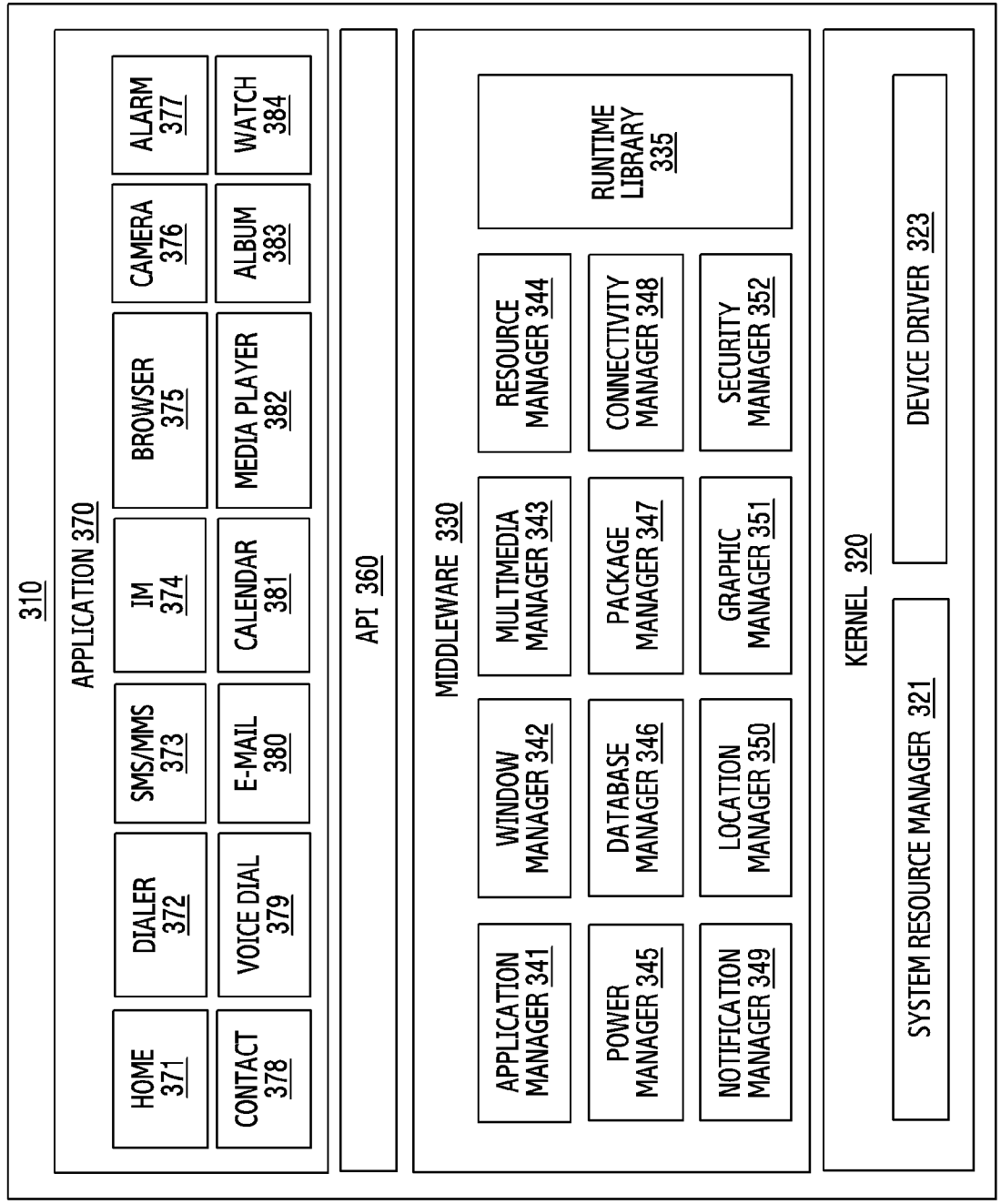
FIG. 3 is a block diagram of a program module according to various embodiments of the disclosure.

FIG. 3 is a block diagram of a program module according to various embodiments of the disclosure. According to an embodiment, the program module 310 (e.g., the programs 140) may include an operating system for controlling resources related to the electronic device (e.g., the electronic device 101) and/or various applications (e.g., the application programs 147), which are executed under the operating system. For example, the operating system may include Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least some of the program module 310 may be preloaded in the electronic device, or may be downloaded from external electronic devices (e.g., the electronic devices 102 and 104 or the server 106).

The kernel 320, for example, may include a system resource manager 321 and/or a device driver 323. The system resource manager 321 may perform control, allocation, or collection of system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an IPC (inter-process communication) driver. The middleware 330, for example, may provide functions required in common for the applications 370, or may provide various functions to the applications 370 through the API 360 in order to allow the applications 370 to use the limited system resources in the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335, for example, may include a library module that a compiler uses in order to add new functions through programming languages while the applications 370 are executed. The runtime library 335 may perform input/output management, memory management, or an arithmetic calculation process. The application manager 341, for example, may manage the life cycle of the applications 370. The window manager 342 may manage GUI resources used on the screen. The multimedia manager 343 may identify formats for reproducing media files, and may perform encoding or decoding of media files using a codec conforming to the corresponding format. The resource manager 344 may manage source code or memory space for the applications 370. The power manager 345, for example, may manage the capacity or power of the battery, and may provide power information necessary for the operation of the electronic device. According to an embodiment, the power manager 345 may operate in association with a BIOS (basic input/output system). The database manager 346, for example, may generate, retrieve, or change a database that is to be used in the applications 370. The package manager 347 may manage the installation or update of applications that are distributed in the form of package files.

The connectivity manager 348, for example, may manage a wireless connection. The notification manager 349 may provide information on events, such as received messages, appointments, or proximity notifications, to the user. The location manager 350, for example, may manage location information of the electronic device. The graphic manager 351, for example, may manage graphic effects to be provided to the user or a user interface related thereto. The security manager 352 may provide, for example, system security or user authentication. According to an embodiment, the middleware 330 may further include a telephony manager for managing the functions of a voice call or a video call of the electronic device or a middleware module capable of producing a combination of the functions of the above-described elements. According to an embodiment, the middleware 330 may provide a module that is specialized according to the type of operating system. The middleware 330 may dynamically exclude some typical elements or add new elements. The API 360, for example, may be a group of API programming functions, and may be provided in different configurations depending on the operating system. For example, one set of APIs may be provided to each platform in the case of Android or iOS, and two or more sets of APIs may be provided to each platform in the case of Tizen.

The applications 370, for example, may include an application of home 371, a dialer 372, SMS/MMS 373, IM (instant messaging) 374, a browser 375, a camera 376, an alarm 377, contacts 378, a voice dialer 379, e-mail 380, a calendar 381, a media player 382, an album 383, a watch 384, healthcare (e.g., measuring the amount of exercise or blood glucose), or providing environment information (e.g., providing atmospheric pressure, humidity, or temperature information), or the like. According to an embodiment, the applications 370 may include an information-exchange application that supports the exchange of information between the electronic device and external electronic devices. The information-exchange application may, for example, include a notification relay application for relaying specific information to the external electronic devices, or may include a device management application for managing the external electronic devices. For example, the notification relay application may transfer notification information generated in other applications of the electronic device to the external electronic device, or may receive notification information from the external electronic device to thus provide the same to the user. The device management application, for example, may install, delete, or update functions (e.g., turning on and off the external electronic device (or some elements thereof) or adjusting the brightness (or resolution) of a display) of an external electronic device that communicates with the electronic device or applications executed in the external electronic device. According to an embodiment, the applications 370 may include applications that are designated according to the attributes of the external electronic device (e.g., a healthcare application of a mobile medical device). According to an embodiment, the applications 370 may include applications that are received from the external electronic device. At least some of the program module 310 may be implemented (e.g., executed) as software, firmware, hardware (e.g., the processor 120), or a combination thereof, and may include modules, program routines, sets of instructions, or processors for executing one or more functions.

According to an embodiment, the applications 370 may include an application (e.g., a facial recognition application) for identifying participants in the meeting. According to an embodiment, the applications 370 may include an application (e.g., a motion recognition application) for identifying the motion of a participant (e.g., tracking a head or eye motion) in the meeting. According to an embodiment, the applications 370 may include an application {e.g., automatic speech recognition (ASR) or NUJ} capable of recognizing and controlling a voice from a received voice signal. According to an embodiment, the applications 370 may include an application {e.g., text to speech (TTS)} for natural language processing.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Hereinafter, the disclosure relates to a device and a method for conducting a meeting in a wireless communication system. Specifically, the disclosure describes operations of learning information personalized for each user and providing a meeting pattern, thereby providing an optimal meeting environment.

Figure 4:
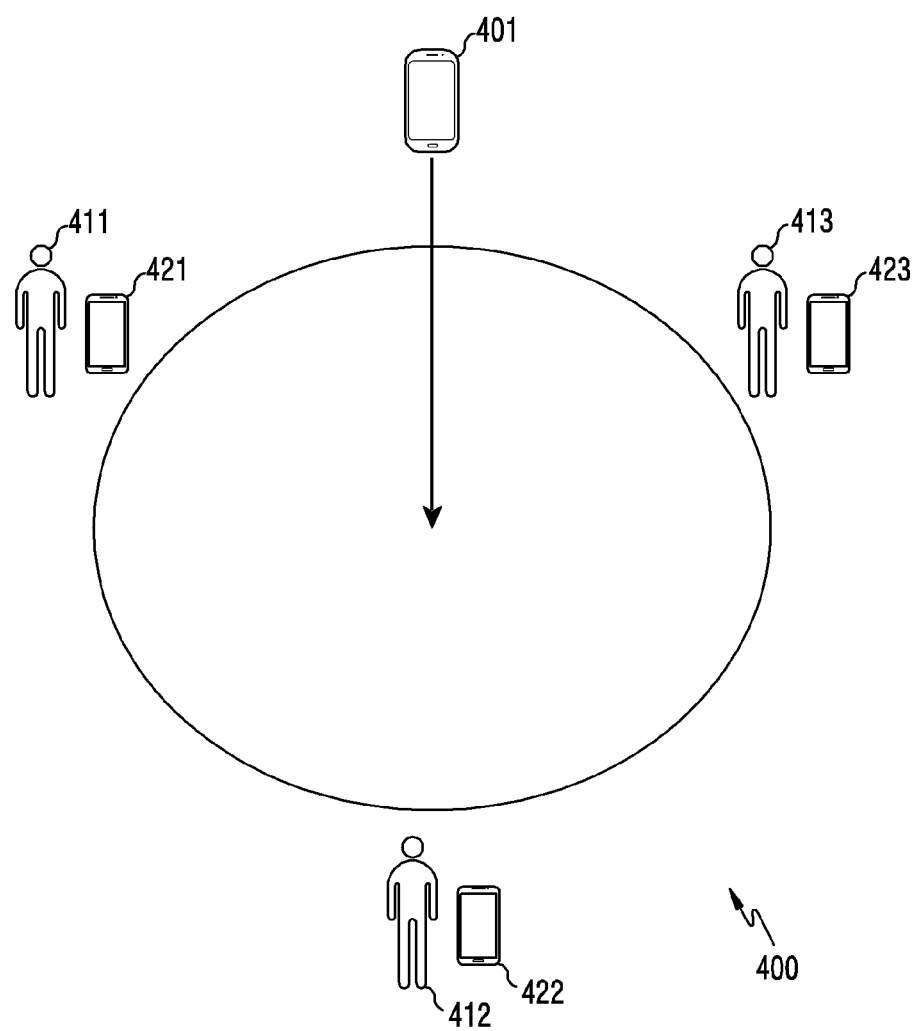
FIG. 4 illustrates a meeting environment according to various embodiments of the disclosure.

FIG. 4 illustrates a meeting environment according to various embodiments of the disclosure. Hereinafter, necessary terms will be defined and a sufficient environment will be explained in FIG. 4 in order to describe various embodiments. It should be noted that terms referring to control information, terms referring to a signal processing scheme (e.g., analysis, judgement, determination, and the like), terms referring to a state change (e.g., an event), terms referring to a transmission signal, terms referring to network entities, the terms referring to messages (e.g., signals or information), the terms referring to elements of the device, and the like, which are used herein, are only examples for the convenience of explanation. Accordingly, the terms described below in this document may be replaced by other terms having the same technical meaning.

Referring to FIG. 4, a meeting environment 400 may include an electronic device 401 (e.g., the electronic device 201) as a device for providing a meeting. Here, the meeting may mean an action in which at least two users perform communication. More specifically, the meeting may refer to an action in which at least two users share opinions, request a response, or require consent with respect to a common agenda. That is, the meeting in this document may encompass conferences officially planned for discussion, congressional sessions in which delegates gather for discussion, counseling sessions for advice, regular conventions, family meetings, video conversations, and the like. In addition, the electronic device 401 may be referred to as an "adaptive operator", a "meeting apparatus", a "meeting operator", an "adaptive meeting operator", a "multimodal device", an "interactive meeting apparatus", and the like depending on the embodiment.

The meeting environment 400 may include a first user 411, a second user 412, and a third user 413. Each of the first user 411, the second user 412, and the third user 413 may be referred to as an "attendant" or a "participant". All of the first user 411, the second user 412, and the third user 413 may be referred to as "attendees" or "participants". Hereinafter, the user attending the meeting may be called a "participant".

The respective participants may be identified according to their roles. For example, the first user 411 may be a conference host who is a participant conducting a specific meeting. The second user 412 may be a presenter who is a participant providing information on a specific subject. The users 413 may be an audience as participants who hear opinions and ask questions as necessary. Hereinafter, a description will be made on the basis of three users attending the meeting, but the disclosure is not limited thereto. For example, the meeting environment 400 may include two participants, or may include four or more participants.

The electronic device 401 may obtain information about the meeting environment 400. The information may include advance information, which is preconfigured with respect to the meeting environment 400 or which is updated and stored in a previous cycle. In addition, the information may include collection information that is continuously collected from the meeting environment 400. The collection information may include sound information about sounds recognized from the meeting environment 400, image information about images collected from the meeting environment 400, and environment information such as the temperature or humidity of the meeting environment 400.

The electronic device 401 may provide at least one of the participants with a pattern for conducting a meeting using the obtained information. The pattern may be referred to as a "meeting pattern". The meeting pattern denotes a method of using resources for conducting a meeting. The resources may include time resources allocated to at least one of the participants, information resources for providing information to at least one of the participants, and context resources for controlling the environment of at least one of the participants. The electronic device 401 may repeatedly perform an operation of collecting the above information and an operation of providing a meeting pattern, thereby adaptively providing a meeting pattern to at least one of the participants.

In some embodiments, the meeting pattern may include, as a method of using time resources, at least one of an utterance period allocated to each of the users attending the meeting, the order of speaking, a priority for speaking, or the order of subjects. In some other embodiments, the meeting pattern may include, as a method of using information resources, at least one piece of personal information (e.g., ranks, identifiers (IDs), names, and the like) of the respective users participating in the meeting, information about the user who is speaking, information about the subject under discussion, or information about all subjects. In some other embodiments, the meeting pattern may include, as a method of using context resources, at least one of the performance of a microphone of each of the users participating in the meeting or the performance of a speaker thereof (e.g., volume control), or the brightness of lighting in the environment in which each user is located, the brightness of a provided screen, or noise.

The first user 411, the second user 412, and the third user 413 may use a first electronic device 421 (e.g., the electronic device 102 or the electronic device 104), a second electronic device 422, and a third electronic device 423, respectively, for conducting a meeting. For example, the first electronic device 421 may include at least one of a microphone for providing the voice of the first user 411 to the second user 412 who is another participant, a speaker for providing the voice of the second user 412 to the first user 411, a display for providing the first user 411 with information necessary for the meeting, or an input unit for manual control. The first electronic device 421, the second electronic device 422, and the third electronic device 423 may be connected to the electronic device 401 by wired or wireless communication. In some embodiments, unlike the configuration shown in FIG. 4, the electronic device 401 may be included in at least one of the first electronic device 421, the second electronic device 422, or the third electronic device 423. For example, if the first electronic device 421 includes the electronic device 401, the first user 411 may conduct the meeting, as well as give a speech, through the first electronic device 421.

The first electronic device 421 is used by the first user 411, and communicates with the electronic device 401 through a wired or wireless channel. Optionally, the first electronic device 421 may operate without the user's direct control. That is, the first electronic device 421 may perform machine-type communication (MTC), and may not be carried by the user. The first electronic device 421 may be referred to as a "terminal", "user equipment (UE)", a "mobile station", a "subscriber station", a "remote terminal", a "wireless terminal", a "user device", or any other term having an equivalent technical meaning.

The second electronic device 422 and the third electronic device 423 may have configurations the same as or similar to those of the first electronic device 421. Meanwhile, the first electronic device 421, the second electronic device 422, and the third electronic device 423 may have configurations the same as or similar to those of the electronic device 401.

The meeting environment 400 may include various spatial environments. The electronic device 401 may provide participants with a meeting pattern within a limited space. The participants may be located within the limited space. The limited space may be referred to as a "meeting room". The electronic device 401 may provide a meeting pattern to the participants using the first electronic device 421, the second electronic device 422, and the third electronic device 423, which are connected to the electronic device 401 through wired communication. Meanwhile, if the meeting room allows a meeting to be conducted through direct dialogues between the participants, the electronic device 401 may provide a meeting pattern without using the first electronic device 421, the second electronic device 422, or the third electronic device 423. In this case, the electronic device 401 is able to identify voice signals of respective ones of the first user 411, the second user 412, and the third user 413, from among mixed voice signals.

The electronic device 401 may also conduct a meeting in each of a plurality of limited spaces. Although FIG. 4 shows that the meeting is conducted in one limited space, the disclosure is not limited thereto. The meeting environment 400 may include a video conference or teleconference in which meetings are held by participants who are distant from each other. The first user 411, the second user 412, and the third user 413 may be located at geographically different places from each other. The electronic device 401 may provide a meeting pattern in each of the separated spaces using the first electronic device 421, the second electronic device 422, and the third electronic device 423, which are wirelessly connected to the same.

In the following description, the proceedings of a meeting may be classified according to subject. For example, the electronic device 401 may conduct a first meeting on a first subject and a second meeting on a second subject differently from each other. In addition, a specific subject may have a hierarchical structure. For example, a meeting on a first major subject may include a meeting on a first minor subject, a meeting on a second minor subject, and a meeting on a third minor subject. In some embodiments, the electronic device 401 may obtain information about the subject of an ongoing meeting or the subject of a meeting to be held according to a predetermined order or through natural-language recognition of the speaking of users. The natural-language recognition may include a process of converting a voice signal into text {speech to text (STT)} and a process of parsing the converted text into sentences and words. By determining a subject, an object, and the relationship therebetween in the sentence, the electronic device 401 may obtain semantic information of the voice signal.

The proceedings of a meeting may be classified depending on users. For example, a meeting on a specific subject may include the speaking of the first user 411, the speaking of the second user 412, the speaking of the third user 413, and information related to the specific subject (e.g., summary information about a specific subject, references to a specific subject, additional information thereof, and the like). The electronic device 401 may obtain information about at least one of a user who is speaking, a user who is going to speak next, a conference host, speakers, and listeners through identification information of the respective participants, voice signals of the respective participants, or image information of the respective participants, which is obtained in advance.

In FIG. 4, terms for information necessary for the electronic device 401 to adaptively conduct a meeting and patterns for adaptively providing a meeting have been defined, and environments in which the meeting is conducted has been described. Hereinafter, detailed operations of the electronic device 401 (e.g., training, moderation, and the like) for adaptively providing patterns through the information will described with reference to FIG. 5.

Figure 5:
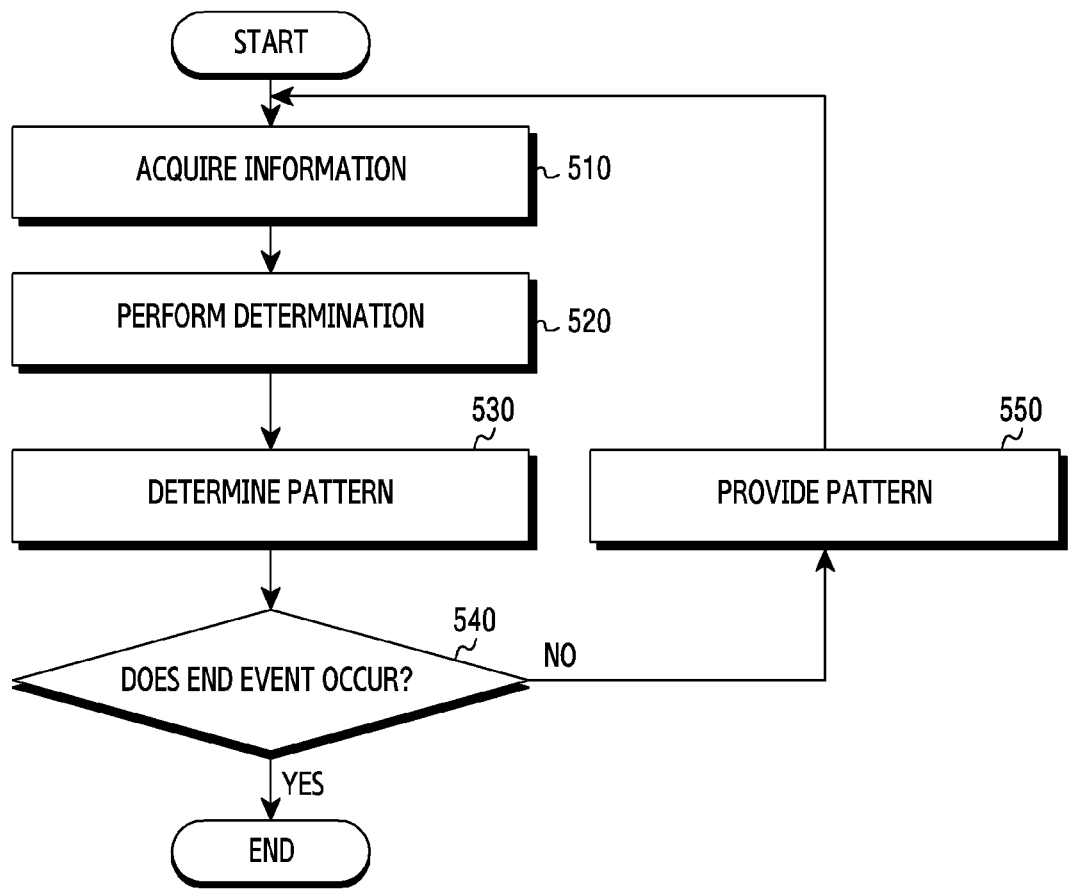
FIG. 5 is a flowchart of an electronic device according to various embodiments of the disclosure.

FIG. 5 is a flowchart of an electronic device according to various embodiments of the disclosure. The electronic device may be the electronic device 401 in FIG. 4. The electronic device 401 may adaptively provide a meeting pattern to the participants through operations 510 to 550.

Referring to FIG. 5, in operation 510, the electronic device 401 may obtain information. The information may include advance information that is preconfigured about the meeting environment 400 before operation 510. In some embodiments, the advance information may include information about participants. For example, the information about participants may include at least one of names, nicknames, ages, ranks, or IDs of the respective participants, a total number of users participating in the meeting, tendencies or speaking habits of the respective participants, information about the subject in which the participants are interested, or information about users who are going to attend the meeting. In addition, if at least one of the participants (e.g., the first user 411) uses an electronic device (e.g., the first electronic device 421), the information about the participants may include an ID of the electronic device. Here, the ID of the electronic device may be used to indicate the participant.

In some other embodiments, the advance information may include information about the subject of the meeting. For example, the information about the subject of the meeting may include the category of the subject to be discussed at the meeting, the structure of a plurality of subjects (e.g., the relationship between a major subject and a minor subjects), the sequence of proceeding with the subjects, or information on whether or not the meeting is regular.

In some other embodiments, the advance information may include information about the type of meeting. For example, the information on the type of meeting may indicate whether the meeting is configured as a format of discussion in which multiple participants share opinions on the basis of a common agenda at the meeting, a format of a report/presentation through information provision and questions, or a format of an interview that requires specific questions to be answered.

In some other embodiments, the advance information may include information about the location at which the meeting is held. For example, the information about the location may include information on whether or not the meeting is remotely conducted, whether or not the respective users participating in the meeting have electronic devices, information about the absolute locations of the users, and information about environments in which the respective users are located (e.g., the size of a room, information on whether or not the brightness of lighting is controllable, and the like).

The advance information may include information on a previous pattern. The electronic device 401 may use the information on the previous pattern when performing operation 510 after operation 550, which will be described later. The information about the previous pattern may be training data for determination in the current cycle. The information about the previous pattern may include information on patterns determined in previous cycles during the repetition of operations 510 to 550 in FIG. 5. For example, the information about the previous pattern may include a speaking time assigned to the first user 411 in connection with the previous subject. As another example, the information about the previous pattern may include the order of speaking for each participant, which was assigned in connection with a specific subject in the previous cycle.

The advance information may include initial information on the pattern. If the repeated operations in FIG. 5 have not been performed, or if the current preconditions are quite different from the previous preconditions, the electronic device 401 may use the initial information as advance information. In some embodiments, the initial information may be determined by means of statistics obtained through repeated experiments in a laboratory or repeated simulations. In some other embodiments, the initial information may be determined by means of random variables. In this case, the electronic device 401 may increase the probability (e.g., reliability) of a pattern that is determined after operations 510 to 550 are repeated a predetermined number of times or more.

The information may include collection information that is repeatedly obtained from the meeting environment 400. In some embodiments, the collection information may be sound information. For example, the sound information may include a voice signal of a specific participant. The sound information may include data on the intensity of the voice signal (the amplitude of a sound wave), data on a high or low tone of the voice signal (the frequency of a sound wave), and data on the shape of the voice signal (the timbre of a sound wave). The electronic device 401 may collect the sound information for a specific period of time. The specific period of time may be adaptively determined according to the speaking time of the participant. The electronic device 401 may determine the speaking speed of the participant using the sound information.

In some other embodiments, the collection information may be image information. For example, the image information may include an image containing a user or a video containing a user. The image containing the user may include a portion of a face (e.g., eyes, a mouth, a brow, a nose), among the user's body parts. The video containing the user may include a motion and a gesture of the user. As another example, the image information may include an image of the place where the user is located. The image of the place may include information about the size of the space in which the user is located, the number of persons close to the user, and the like. As another example, the image information may include an image of information provided from the user for reference. The information provided by the user may include meeting data prepared by the user for the meeting.

In some other embodiments, the collection information may be environment information. For example, the environment information may include at least one piece of data on the temperature of the place where the participant is located, data on the illuminance thereof, or data on the humidity thereof. As another example, the environment information may include information on the absolute location of the place where the participant is located. As another example, the environment information may include information on the density of the place where the participant is located. Here, the density may be defined as a ratio of the area of the space in which the meeting is to be conducted to the actual number of participants or a ratio of the appropriate number of participants to the actual number of participants in the area. As another example, the environment information may include at least one piece of information on the absolute time of the participant, information on the date on which the meeting is conducted, information on the local time in the region where the participant is located, or information on the day of the week.

If at least some of the participants in the meeting are located in a separate location, the electronic device 401 may collect environment information about each location. On the other hand, if the participants are located in one place, the electronic device 401 may collect environment information about one place.

In operation 520, the electronic device 401 may make a judgement on the basis of the obtained information. Here, the judgment may be intended to objectively estimate the subjective perception. For example, on the basis of the obtained information, the electronic device 401 may make a judgement to identify a participant, a judgement to determine the characteristics of a participant, a judgement to determine the emotions of a participant, or a judgement to recognize the intention of a participant. Hereinafter, an operation of processing the judgement will be described in detail.

The electronic device 401 may identify a participant on the basis of the obtained information. In some embodiments, the obtained information may be sound information. For example, the electronic device 401 may judge a specific participant through the shape of a sound wave, i.e., the timbre of a sound, included in the sound information. In this case, the electronic device 401 may use the shape of a sound wave for the participant, which was learned in the previous cycle, or may use predetermined information. As another example, the electronic device 401 may identify a specific participant using a language usage pattern included in the sound information. Specifically, the electronic device 401 may convert the sound information into text. The electronic device 401 may divide the converted text into sentences, and may divide the sentence into words through a natural-language recognition operation. The electronic device 401 compares the sentences and words of a specific participant, which were learned in the previous cycle, with the sentences and words of the sound information, which are obtained in the current cycle, thereby detecting the difference between the language usage patterns. The electronic device 401 may identify the specific participant as the source of the sound information if the detected difference value is less than or equal to a threshold value.

In some other embodiments, the obtained information may be image information. For example, the electronic device 401 may obtain an image of a participant included in the image information, thereby judging a specific participant. In this case, the electronic device 401 may use the appearance, shape, or figure of the specific participant, which was learned in the previous cycle, or may use predetermined information. In some other embodiments, the obtained information may be advance information. The electronic device 401 may obtain identification information (e.g., a name, a nickname, an ID, or the like) of the participant included in the advance information, or may obtain an ID of the electronic device used by the participant, thereby identifying a specific user. For example, if the electronic device 401 obtains a voice signal input through a microphone of the third electronic device 423 during the speaking time of the third user 413, the electronic device 401 may judge that the voice signal corresponds to the voice of the third user 413, thereby identifying the third user 413.

The electronic device 401 may determine the characteristics of the participant on the basis of the obtained information. The electronic device 401 may preconfigure the types of characteristics (e.g., a speaking speed, utterance orientation, a facial expression change, and the like) in order to judge the characteristics of the participant. In addition, the electronic device 401 may configure a plurality of levels in a specific type.

In some embodiments, the electronic device 401 may obtain the voice of the third user 413 from the voice signal included in the sound information. The electronic device 401 may determine the speed of the voice of the third user 413. The speed may be referred to as a "speaking speed", a "voice speed", a "speech tempo", or the like. Here, the speaking speed may be defined in various ways in the electronic device 401. A detailed method thereof will be described later with reference to FIG. 8. The electronic device 401 may measure a speaking speed of the third user 413, and may determine a speed level corresponding thereto. The electronic device 401 may determine the speaking speed through repetition of operations 510 to 550. For example, if the average speaking speed of the third user 413 is "7", the electronic device 401 may configure a speaking speed having the level "7" as a characteristic of the third user 413.

In some other embodiments, the electronic device 401 may obtain the voice of the first user 411 from the sound information. The electronic device 401 may recognize detailed content of the obtained voice of the first user 411 through automatic speech recognition (ASR). The electronic device 401 may detect whether or not a dialect is contained in the recognized content. The electronic device 401 may store a pattern of speaking habits of the first user 411 (e.g., accent and tone) from the detected dialect, and may configure the stored pattern as a characteristic of the first user 411.

The electronic device 401 may judge the user's emotions on the basis of the obtained information. The electronic device 401 may preconfigure the types of emotions (e.g., displeasure, affinity, fatigue, or the like) for the judgement of emotion. Each emotion may have a plurality of levels (e.g., degree of displeasure 1 to 8) with respect to the specific type thereof.

In some embodiments, the obtained information may be sound information. For example, the electronic device 401 may obtain the voice of the second user 412 from the sound information. The electronic device 401 may determine the magnitude of the voice of the second user 412. If the magnitude of the voice of the second user 412 is greater than a reference value, the electronic device 401 may determine that the second user 412 is in an excited state. Here, the reference value may be a value representing the magnitude of the voice of the second user 412, which was learned through the previous cycle, or may be an average value of the magnitudes of the voices of ordinary persons. The electronic device 401 may increase the emotion level of the participant who seems to be excited. As another example, if the speaking speed of the third user 413 is higher than a reference speed, the electronic device 401 may determine that the third user 413 is in the excited state. Here, the reference speed may be a speaking speed value configured as a characteristic of the third user 413, which was learned through the previous cycle, or may be an average value of the speaking speeds of ordinary persons. Like the second user 412, the electronic device 401 may increase the emotion level of the third user 413 who seems to be excited.

In some other embodiments, the obtained information may be image information. For example, the electronic device 401 may obtain an image containing the first user 411 from the image information. The electronic device 401 may identify a portion corresponding to the brow of the first user 411, among the body parts of the first user 411 included in the image. The electronic device 401 may compare the identified brow with a reference image. Here, the reference image may be an image including the first user 411, which was previously obtained, or may be an image of the brow of an ordinary person. If the electronic device 401 judges that the change in the brow portion is greater than or equal to a threshold value, the electronic device 401 may determine that the first user 411 does not prefer the user who is speaking at the time of collecting the image information or the subject that is being discussed at the time of collecting the image information. The electronic device 401 may lower the emotion level for the preference of a specific user or a specific subject.

The electronic device 401 may identify the portion corresponding to the pupil of the second user 412, among the body parts of the second user 412 included in the image. The electronic device 401 may compare the size of the pupil with a reference size. The reference size may be a pupil size of an ordinary person. If the electronic device 401 judges that the size of the identified pupil is greater than or equal to a threshold value, the electronic device 401 may determine that the second user 412 prefers the user who is speaking at the time of collecting the image information or the subject that is being discussed at the time of collecting the image information. The electronic device 401 may increase the emotion level for the preference of a specific user or a specific subject.

In some other embodiments, the obtained information may be environment information. For example, the electronic device 401 may determine that the temperature of the place in which the meeting is conducted (hereinafter, referred to as a "meeting place") is greater than or equal to a predetermined level using the environment information. The predetermined level may be a level of a temperature vale at which a user does not feel uncomfortable (e.g., a medium level, among a low level, a medium level, and a high level). If the temperature of the meeting place is greater than or equal to the predetermined level (e.g., a high level), the electronic device 401 may determine that at least one user located at the meeting place feels uncomfortable. The electronic device 401 may increase the emotion level of each user for displeasure according thereto.

The electronic device 401 may judge the intention of the participant on the basis of the obtained information. The electronic device 401 may preconfigure the types of intentions in order to accurately judge the intentions of the participant. For example, the intentions may include at least one of a request for granting the right to speak to another user, a request for obtaining the right to speak from another user, a request for extension of a speaking time, a notice of speaking termination (early termination) with respect to the corresponding subject, a request for adjournment of the meeting for a predetermined period of time, provision of information, a request for information, or a request for changing the order of speaking.

In some embodiments, the obtained information may be sound information. For example, the electronic device 401 may analyze a sound spectrum of the sound information. The electronic device 401 may identify the voice signal of the second user 412 by means of the analysis. The electronic device 401 may identify words from the voice signal of the second user 412 through natural-language recognition. The electronic device 401 may recognize the intention of the second user 412 from the identified words. For example, the electronic device 401 may obtain a natural-language phrase "John, why don't you answer?" from the voice signal of the second user 412. The electronic device 401 may identify "John", "you", and "answer" from the obtained natural language, respectively, and may judge the intention to make a request for an answer to another user (e.g., the third user 413) corresponding to "John". As another example, the electronic device 401 may obtain a natural language "Let's discuss our summer vacation" from the voice signal of the second user 412. The electronic device 401 may identify "summer vacation" from the obtained natural language. The electronic device 401 may determine the subject that the second user 412 wishes to speak about on the basis of the identified words. In this case, the electronic device 401 may identify a category (e.g., vacation) related to "summer vacation" from among a plurality of predetermined categories. For example, if no voice of the first user 411 is detected during the specified speaking time of the first user 411, the electronic device 401 may recognize the intention of the first user 411 to terminate the speaking. The electronic device 401 may judge that the speaking occasion of the first user 411 is to be terminated earlier than a specified speaking time.

In some other embodiments, the obtained information may be image information. For example, the electronic device 401 may obtain a gesture of the third user 413 from the image information. The gesture of the third user 413 may be a gesture previously stored in the electronic device 401 in order to perform a specific function. The electronic device 401 may obtain a gesture of the third user 413, and may identify a function corresponding to the obtained gesture, among previously stored information. The electronic device 401 may judge that the third user 413 intends to perform the identified function.

Although operation 520 in FIG. 5 describes that the respective judgments are performed in parallel and independently, the disclosure is not limited thereto. A specific judgment may be used as the premise for another judgment. That is, the judgement on the intention of the user may be used as information necessary for the judgement on the emotion of the user, or the judgement on the emotion of the user may be used as the judgement on the characteristics of the user. Operation 520 may include multiple judgement operations, and multiple judgement operations may be configured as layers. For example, in the case where the judgement operation is performed three times, three layers may be formed. The number of layers may be referred to as a "depth". For example, if one judgement operation requires three previous judgement operations, the judgement operation is performed four times in total, and thus the depth may be 4. As the depth is increased, the more judgment operations are performed and computational complexity is increased, but the accuracy of the judgment may be improved.

Meanwhile, if the sound information obtained in operation 510 includes a voice signal of a participant, the length of the input signal may be variable (i.e., not fixed). This is due to the fact that the voice signals have different lengths depending on the speaking time. Accordingly, the electronic device 401 may use a recurrent neural network (RNN). The electronic device 401 may perform recursive judgement, thereby efficiently performing natural-language processing or voice recognition, which is a variable input. Operation 520 may include a plurality of judgement operations, and the respective judgement operations may include recursive structures. The more recursive layers there are, the higher the computational complexity, and the higher the accuracy of judgment.

In operation 530, the electronic device 401 may determine a pattern on the basis of the judgement made. The operation of determining the pattern may be performed by a pattern adapter in the electronic device 401. The pattern may be a pattern for conducting a meeting (hereafter, referred to as a "meeting pattern") or a pattern for terminating a meeting (hereinafter, referred to as a "termination pattern"). The termination pattern will be described in detail later in connection with operation 540.

The meeting pattern may be a method of using resources for conducting a meeting. In some embodiments, the resources for conducting the meeting may be time resources.

For example, the electronic device 401 may determine a total meeting time. The electronic device 401 may determine the total meeting time on the basis of the speaking speed of the participants. If the average speaking speed of the participants in the previous meeting is "5" for 10 minutes allocated, and if the average speaking speed of the participants in the current meeting is "10", the electronic device 401 may determine the total meeting time of the current meeting to be 5 minutes.

As another example, the electronic device 401 may determine a meeting time for a specific subject. The electronic device 401 may determine the meeting time on the basis of the preferences of the participants. Among a first subject and a second subject, if the participants prefer the second subject to the first subject, three minutes of the total meeting time of 10 minutes may be allotted to the first subject, and seven minutes thereof may be allotted to the second subject.

As another example, the electronic device 401 may determine the order of the subjects of the meeting. The electronic device 401 may determine the order of the subjects of the meeting on the basis of the emotion levels of the participants. The electronic device 401 may adaptively change the order of the subjects in which the emotion levels of the participants for fatigue are judged to be relatively high, among a plurality of subjects.

As another example, the electronic device 401 may determine the speaking time for each participant. The electronic device 401 may determine the speaking time for each participant on the basis of the speaking speed of each participant. For example, if the speaking speeds of the first user 411, the second user 412, and the third user 413 are "1", "2", and "3", respectively, the electronic device 401 may allocate speaking times of "6 minutes", "3 minutes", and "2 minutes" to the first user 411, the second user 412, and the third user 413, respectively, in inverse proportion to the speaking speed.

As another example, the electronic device 401 may determine the order of speaking for the respective participants. The electronic device 401 may determine the order of speaking on the basis of the voice signal of a specific participant. The electronic device 401 may identify and understand a natural language from the voice signal of the first user 411. The electronic device 401 may obtain information indicating the second participant 412 who is the next participant (e.g., the name of the second user 412) from the obtained natural language. The electronic device 401 may determine the order of speaking in the order of the first user 411 and the second user 412.

As another example, the electronic device 401 may determine a priority for each participant. The electronic device

401 may identify the first user 411 who is a conference host, among the participants, using the sound information, the image information, or the advance information. The electronic device 411 may give priority to the first user 411 over other participants. If the speaking of the first user 411 occurs simultaneously with the speaking of the second user 412, the electronic device 401 may give the first user 411 priority to speak. When the first user 411 terminates speaking, the electronic device 401 may give the right to speak to the second user 412. Specifically, when the speech of the first user 411 is terminated, the electronic device 401 may switch the microphone of the second electronic device 422 from the OFF state to the ON state.

In some other embodiments, the resources for conducting the meeting may be information resources. The electronic device 401 may provide the information resources to the participants in the form of sound, or may provide the information resources to the electronic devices of the respective participants in the form of images. The information resources may include a variety of information. For example, the information resources may include summary information. If early termination is judged in operation 520, the electronic device 401 may determine to provide summary information on the subject to the electronic devices of the respective participants during the remaining time. As another example, the information may include remaining-time information to be provided to the user who is speaking. As another example, the information resources may include information for distinguishing between a participant who is speaking and a participant who is not speaking. As another example, the information resources may include information on the order of speaking of the respective participants.

In some other embodiments, the resources for conducting the meeting may be context resources. Here, the context resources may include illuminance. For example, it is assumed that the electronic device 401 conducts a meeting in an environment where the illuminance can be adaptively controlled (e.g., a smart building). If the electronic device 401 judges that the participants feel uncomfortable with respect to the current illuminance (for example, a change in the brow) in operation 520, the electronic device 401 may control the lighting of the meeting place so as to reduce the illuminance. As another example, the context resources may include temperature. If the electronic device 401 judges that the participants feel uncomfortable (e.g., due to the temperature level included in the environment information) in operation 520, the electronic device 401 may control the air conditioner of the meeting place so as to lower the temperature of the meeting place. As another example, the context resources may include the volume of a microphone. If the electronic device 410 judges that the participants feel uncomfortable during the speaking of the first user 411 (e.g., the magnitude of the voice of the first user) in operation 520, the electronic device 401 may adjust the volume of the microphone of the first electronic device 421 so as to be lowered.

In operation 540, the electronic device 401 may judge whether or not a termination event has occurred. In some embodiments, the electronic device 401 may judge whether or not a termination event has occurred on the basis of the determined pattern. If the pattern determined in operation 530 is intended for termination of the meeting, the electronic device 401 may determine that an event for terminating the meeting has occurred. For example, the electronic device 401 may determine a gesture of the conference host requesting termination of the meeting, which is obtained from the sound information, or a comment of the conference host requesting termination of the meeting, which is obtained from the sound information, to be a termination pattern. As another example, if the electronic device 401 detects the absence of a speaker for a predetermined period of time or more using the image information, the electronic device 401 may determine a termination pattern.

In some other embodiments, the electronic device 401 may judge whether or not a termination event has occurred independently from the determination of the pattern. For example, the termination event may correspond to expiration of an assigned meeting time. If all of the times allotted to a plurality of configured meeting subjects have elapsed, the electronic device 401 may determine that a termination event has occurred.

If a termination event occurs, the electronic device 401 may terminate the operations in FIG. 5. Although FIG. 5 shows that operation 540 is performed after operation 530, the disclosure is not limited thereto. That is, the electronic device 401 may judge whether or not a termination event has occurred at any step, as well as after operation 530. For example, if an input indicating termination is detected, the electronic device 401 may terminate the operations in FIG. 5, regardless of operations 510 to 540 described above.

The electronic device 401 may provide a pattern in operation 550. The operation of providing the pattern may be performed by a meeting operator in the electronic device 401. The pattern is intended to conduct a meeting, and may be determined in operation 530. In some embodiments, the meeting pattern may be allocation of speaking time. The electronic device 401 may allocate speaking time according to the determined pattern to at least one of the first user 411, the second user 412, and the third user 413. For example, three minutes of speaking time may be allocated to the third user 413. If the voice signal is obtained from the third user 413 for more than three minutes, the electronic device 401 may limit the speaking of the third user 413. The electronic device 401 may limit the speaking of the third user 413 by turning off the microphone of the third electronic device 423 provided to the third user 413.

In some other embodiments, the meeting pattern may be the order of speaking. The electronic device 401 may apply the order of speaking according to the determined pattern to the respective participants (e.g., the first user 411, the second user 412, and the third user 413). For example, the electronic device 401 may perform control such that the microphones of the first electronic device 421, the second electronic device 422, and the third electronic device 423 are turned on sequentially according to the determined order of speaking.

In some other embodiments, the meeting pattern may be additional information. For example, the electronic device 401 may provide the first user 411 with a UI as additional information. The electronic device 401 may control the first electronic device 421 so as to display the UI on the display of the first electronic device 421. The UI may include at least one piece of information on ongoing subjects, information on a subject to be scheduled, information on the current speaker, information on the subsequent speaker, or a remaining speaking time. As another example, the electronic device 401 may provide the second user 412 with a notification message as additional information. The notification message may be intended to inform the second user 412 of the remaining speaking time (e.g., 10 seconds). The electronic device 401 may provide the second user 412 with a voice signal indicating the remaining speaking time through a speaker operatively connected to the electronic device 401, or may provide a notification message to the second user 412 through the second electronic device 422 carried by the second user 412. In the case where the notification message is provided through the second electronic device 422, the notification message may be provided while being included in the above-described UI, or may be provided by lighting a lamp provided in the electronic device 422. As another example, the electronic device 401 may provide the third user 413 with information about content of the meeting as additional information. The electronic device 401 may provide a display of the electronic device 423 with data on the subject of the meeting in the form of a UI including the same. Here, the data may be provided in advance from an arbitrary user, or may be generated through a natural-language recognition operation of the electronic device 401.

In some other embodiments, the meeting pattern may be break time. For example, the electronic device 401 may provide a break time according to a determined pattern to all of the participants. The electronic device 401 may generate a natural language to provide notification of the break time. Specifically, the electronic device 401 may generate a natural-language message "The meeting will continue after a break of 3 minutes". The electronic device 401 may convert the generated text into a voice signal (TTS), and may transmit the voice signal to all of the participants. In the case where the electronic device 401 determines a break of one minute between the first subject and the second subject, the electronic device 401 may halt the speaking of all the participants for one minute when the speaking of the last speaker for the first subject ends. The electronic device 401 may perform control such that the microphone of the electronic device of the first speaker for the second subject is turned on after the lapse of one minute.

Although, in the above embodiment, it has been described that one result is determined from one factor in performing judgement through information in operation 520 or in determining a pattern through the result judged in operation 530, this is only an example for the convenience of explanation, and the disclosure is not limited thereto. That is, one piece of information may be used for a plurality of judgments, or one judgment may be used for determining a plurality of patterns. In addition, a plurality of pieces of information may be used for one judgment, or a plurality of judgments may be used for determining one pattern. For example, when judging a user, image information, environment information, and ID information of the electronic device used by the user, as well as the voice signal of the user, may be collectively used. The electronic device 401 may judge the user using a probability or a weight for each piece of information available for judging the user.

The electronic device 401 may repeat operations 510 to 550. One repetition may be referred to as a "cycle". The electronic device 401 may optionally set start and end times of the cycle. The electronic device 401 may set the cycle differently according to at least one of the target to be judged and the pattern to be determined. For example, if the electronic device 401 intends to judge a user's preference for a specific subject, the electronic device 401 may configure the cycle as the interval between the start time and the end time of discussion about one subject. As another example, when the electronic device 401 intends to determine the speaking time for each participant, the electronic device 401 may configure the cycle as a unit time defined to measure the speaking speed of a specific participant.

Although not shown in FIG. 5, whenever the electronic device 401 provides a pattern determined on the basis of the collected information, the electronic device 401 may store learning information about the collected information, the judgment, and the provided pattern. The electronic device 401 may store the learning information in a storage unit (e.g., the memory 230) of the electronic device 401, or may store the learning information in an external device (e.g., the server 106). In the case where the learning information is stored in the external device, the electronic device 401 may perform an operation of transmitting the learning information to the external device.

The electronic device 401 may design a model for a plurality of meeting patterns through repetition of the learning operation, such as machine learning, and may make a judgement using a probability or weight for each of the plurality of meeting patterns and a deterministic method based thereon. The probability may be a prior probability of a specific event, or may be a posterior probability of an event occurring on the assumption of a specific event. The operations in the flowchart of FIG. 5 may be referred to as "learning operations" on information to be obtained. The electronic device 401 may obtain a probability or a weight that minimizes an error in the judgment through repetition of the learning operations 510 to 550. Here, each judgment may correspond to a node of a hidden layer or a node of an output layer in a neural network model. The number of judgments preceding a specific judgment may correspond to the depth of the hidden layer.

As the number of repetitions is increased, the electronic device 401 may more accurately provide a judgement on the identification of a user, the characteristics of a user, the emotions of a user, or the intentions of a user. Hereinafter, judgement and determination operations based on probabilities or weights will be described in detail with reference to FIGS. 6 and 7.

Figure 6:
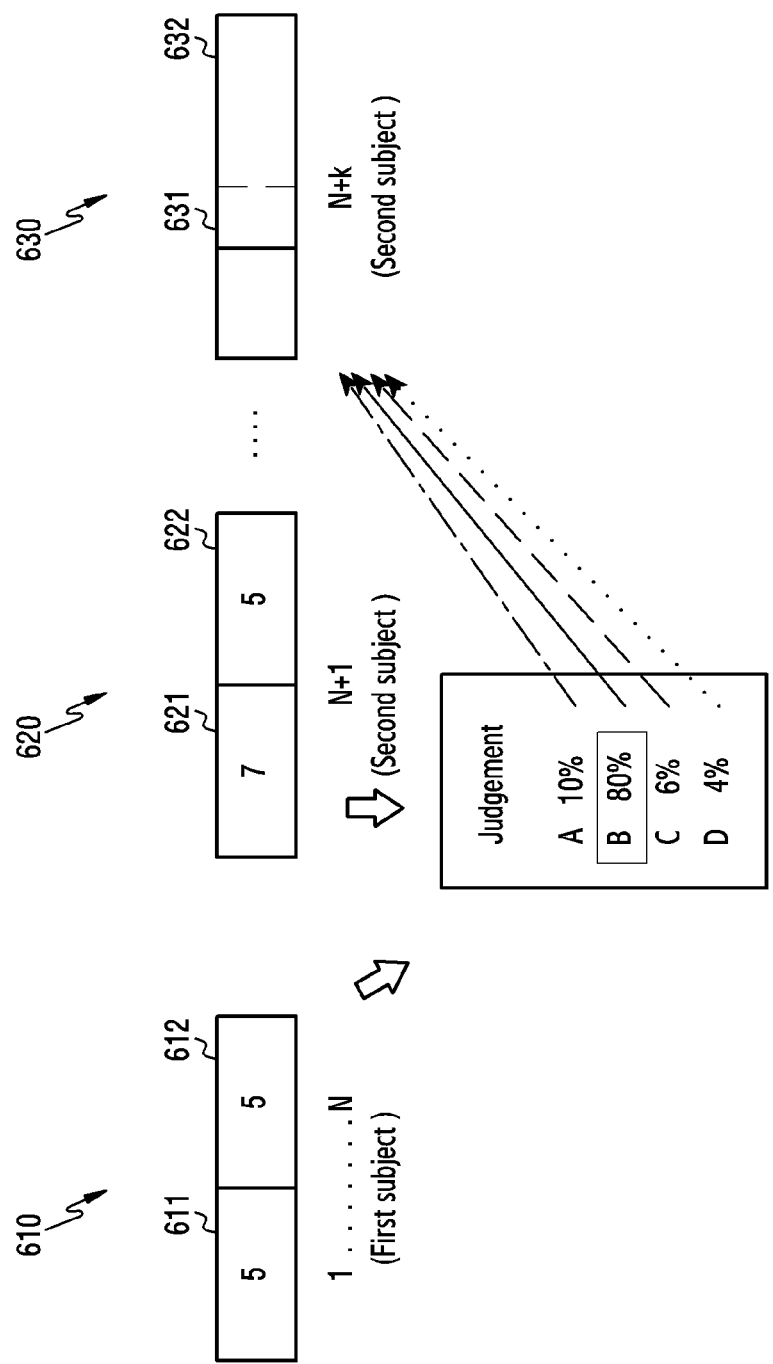
FIG. 6 illustrates an example of judgements according to various embodiments of the disclosure.

FIG. 6 illustrates an example of a judgement operation according to various embodiments of the disclosure. The judgement operation may correspond to operation 520 in FIG. 5. The judgement operation may include a plurality of judgement operations. In other words, the judgement operation shown in FIG. 6 may include an operation of making a judgement again on the basis of a performed judgement, as well as an operation of making a judgement once from the obtained information. As described above, the number of operations of performing another judgement on the basis of the previously performed judgment may be referred to as the "depth" described in operation 520 of FIG. 5. Hereinafter, the operation in which the electronic device 401 judges a change in the speaking speed of a participant and performs multiple judgements according to the change in the speaking speed will be described with reference to FIG. 6.

Referring to FIG. 6, the electronic device 401 may measure the speaking speeds of the first user 411 and the second user 412 during N cycles 610. Here, it is assumed that the speaking speed of each of the first user 411 and the second user 412 measures "5" by the electronic device 401. The electronic device 401 may configure the speaking speed, as a characteristic of the first user 411, as "5" through repetition of operations 510 to 550 in FIG. 5 during N cycles 610. The subject of the meeting conducted during the N cycles may be a first subject.

In the $(N+1)^{th}$ cycle 620, the electronic device 401 may measure the speaking speeds of the first user 411 and the second user 412. The electronic device 401 may determine the speaking speed of the first user 411 to be "7" and the speaking speed of the second user 412 to be "5". The subject of the meeting may be a second subject during the $(N+1)^{th}$ cycle 620. The electronic device 401 may compare the speaking speed of the first user 411 judged as a characteristic of the first user 411 during N cycles 610 (a first judgment) with the speaking speed of the first user 411 measured from a voice signal obtained from the first user 411 in the (N+1)$^{th}$ cycle 620. The speaking speed of the first user 411 may be the advance information stored through learning during N cycles 610.

The electronic device 411 may determine that the speaking speed has increased as a result of the comparison. The electronic device 411 may judge a change in the emotion of the first user 411, the characteristics of the first user 411, the environment of the first user 411, and the intention of the first user 411 according to the increase in the speaking speed (a second judgment). For example, the electronic device 401 may judge that the first user 411 is excited on the basis of an increase in the speaking speed (judgement A). As another example, the electronic device 401 may judge that the first user 411 has more knowledge of the second subject on the basis of the increase in the speaking speed. In other words, the electronic device may judge that first user 411 prefers the second subject to the first subject (judgement B). As another example, the electronic device 401 may judge that the original speaking speed of the first user 411 is "7" and the speaking speed "5", which was previously learned and configured, is wrong (judgement C). As another example, the electronic device 401 may judge that the first user 411 intends to take a break through early termination (judgement D).

The electronic device 401 may produce probabilities of the four judgments. For example, the electronic device 401 may determine the probability of judgement A to be 10%, the probability of judgement B to be 80%, the probability of judgement C to be 6%, and the probability of judgement D to be 4%. Here, the probability may be a prior probability based on statistical information, or may be a posterior probability requiring a specific preceding event.

In some embodiments, the electronic device 401 may make a judgement in order to provide a pattern on the basis of the probabilities of the respective judgements (e.g., judgement A, judgement B, judgement C, and judgement D). For example, the electronic device 401 may configure the speaking speed of the characteristics of the first user 411 on the basis of the probability. The electronic device 401 may determine that judgement B having the highest probability caused the increase in the speaking speed. In other words, the electronic device 401 may judge that the speaking speed has increased because the first user 411 preferred the second subject. The electronic device 401 may configure the speaking speed, as a characteristic of the first user 411, as "7" for the second subject.

In some other embodiments, the electronic device 401 may generate a vector for another judgement on the basis of weights of the respective judgments. The weight may be a probability-based value. The vector may be referred to as a "probability vector". For example, the electronic device 401 may generate a vector (0.1, 0.8, 0.06, 0.04). The respective components of the vector are obtained by converting the probabilities of the respective judgments into weights. The vector may be a vector of the speaking speed of the first user 411 on the second subject. The electronic device 401 may repeatedly generate a vector for each cycle from the subsequently collected information. The electronic device 401 may generate vectors in every cycle, and may continue to update the vectors every time the vectors are generated. The electronic device 401 may continue to update the vectors in order to minimize an error with respect to the actual result. The electronic device 401 may select the vector component having the largest value from among the vectors, or may determine a vector component exceeding a threshold value (e.g., 0.95), thereby selecting a specific judgement from among the plurality of judgments. The electronic device 401 may provide a pattern as shown in operation 530 of FIG. 5 on the basis of the selected specific judgement.

The electronic device 401 may determine a pattern to be provided to the participants during the (N+k)$^{th}$ cycle 630 for the second subject. It is assumed that the electronic device 401 set the speaking speed of the first user 411 to "7" for the second subject in the previous learning operation. Accordingly, the electronic device 401 may allocate "5" (e.g., 5 minutes) of a total time (e.g., 12 minutes) to the first user 411 and "7" (e.g., 7 minutes) of a total time to the second user 412 during the (N+k)$^{th}$ cycle 630.

The electronic device 401 may measure the speaking speeds of both the first user 411 and the second user 412 to be "5" during the (N+k)$^{th}$ cycle 630. Unlike judgement B, the electronic device 401 may also determine the speaking speed of the first user 411 to be "5" for the second subject. The electronic device 401 may recognize that the speaking speed was determined to be different from the speaking speed "7", which is one of the characteristics of the first user 411. The electronic device 401 may change the probability or the weight of each of the plurality of judgments on the basis of information (e.g., sound information of the first user 411) obtained during the (N+k)$^{th}$ cycle 630. Specifically, the electronic device 401 may lower the probability of judgement B, and may increase the probability of judgement C. If there are other additional variables, the electronic device 401 may adjust the probabilities of judgments A to D in consideration of the additional variables.

As described above, a judgement on the intention of the participant from the obtained information (judgement B), a judgment on the emotions of the participant from the judgment on the characteristics of the participant (judgment A), a judgement on the characteristics of the participant from the judgment on the characteristics of the participant (judgement C), and a judgement on the intention of the participant from the judgement on the characteristics of the user (judgement D) are derived from a single event. In other words, a single event may affect the probability of selection of each of the plurality of judgments, and a single judgment may affect the determination of a plurality of patterns. Hereinafter, detailed examples of an operation of making at least one judgement from at least one judgement and an operation of determining a pattern from multiple judgements will be described with reference to FIG. 7.

Figure 7:
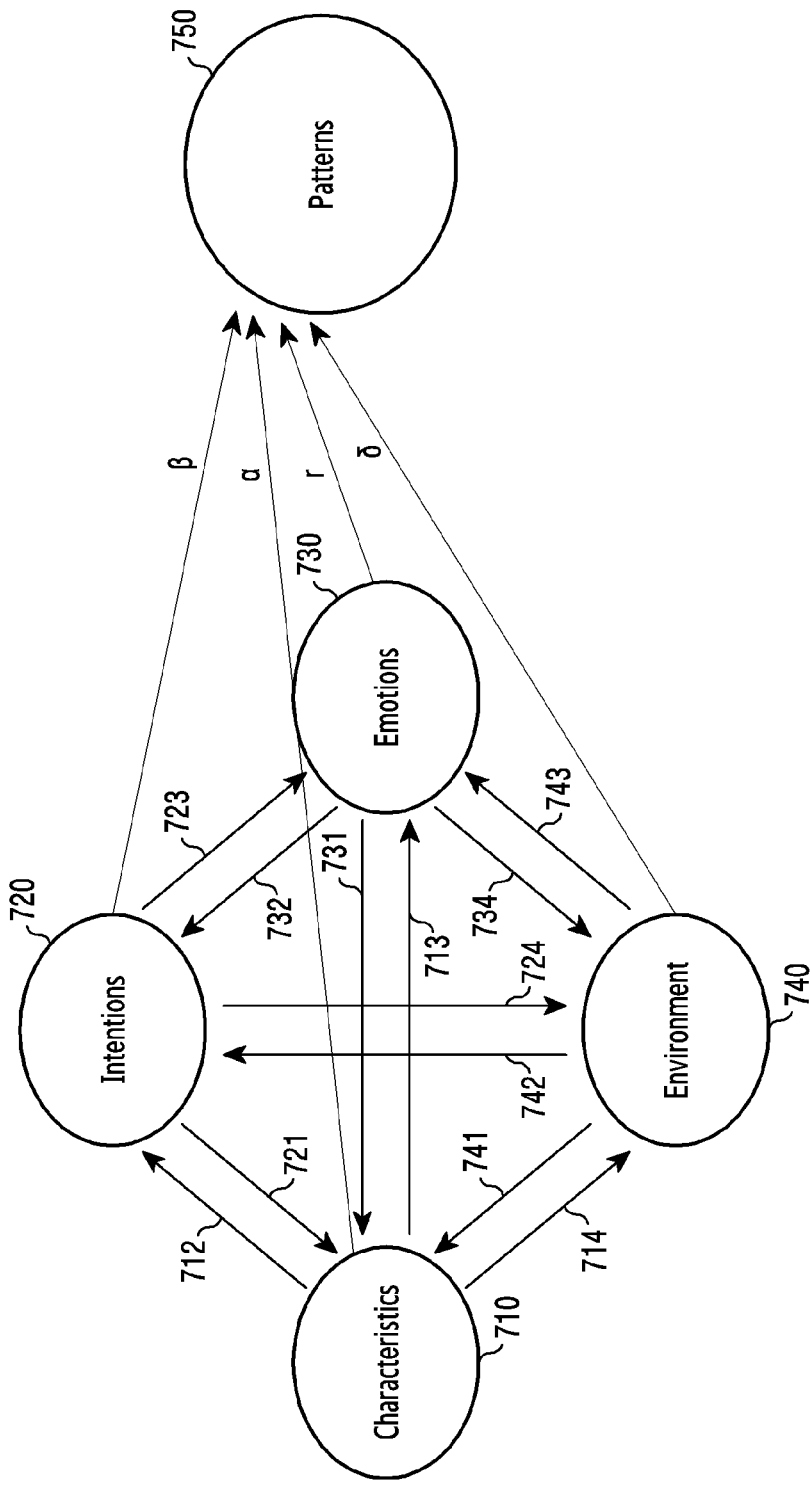
FIG. 7 illustrates an example of factors for determining a pattern according to various embodiments of the disclosure.

FIG. 7 illustrates an example of factors for determining a pattern according to various embodiments of the disclosure. Hereinafter, although the characteristics of a participant, the intentions of a participant, the emotions of a participant, and the environment of a participant will be described as factors to determine a pattern in FIG. 7 for the convenience of explanation, the disclosure is not limited thereto. That is, other judgement factors may be used in addition to the four judgement factors, or fewer judgement factors than the four factors may be used to determine the pattern. The plurality of elements may be referred to as the "state of a participant". In one embodiment, the plurality of states for determining the meeting pattern comprises at least one of a state related to characteristics of the first user, a state related to an intention of the first user, a state related to an emotion of the first user, or a state related to an environment in which the first user is located. In addition, although the speaking time of a participant will be described as an example of a pattern for the convenience of explanation, the disclosure is not limited thereto. The pattern may be a total meeting time, the order of speaking, or the provision of additional information.

Referring to FIG. 7, a judgement about a plurality of elements may be required in order to determine the speaking time of a participant. The plurality of elements may include the characteristics of a participant 710, the intentions of a participant 720, the emotions of a participant 730, and the environment of a participant 740.

The characteristics of a participant 710 may include, for example, at least one of speaking habits, a speaking speed, favorite subjects, disliked subjects, or knowledge understanding of a specific subject by a participant, or a relationship with another participant.

The intention of a participant 720 may include at least one of, for example, a request for extension of a speaking time, a request for acquisition of the right to speak, a request for passing the right to speak to another participant, a request for participation in the meeting, a request for termination of speaking, a request for provision of information, and a request for changing the order of speaking.

The emotions of a participant 730 may include, for example, joy, surprise, fatigue, displeasure, calmness, boredom, and the like. Here, when judging the emotions of a participant 730, the electronic device 401 may set a plurality of levels for each emotion, and may identify the emotion as one of the plurality of levels, or may identify the emotion using probabilities of the respective emotions (e.g., joy 80, fatigue 15, sadness 4, and displeasure 1).

The environment of a participant 740 may include, for example, at least one of the temperature, humidity, and density (e.g., the number of users in the meeting room) in the meeting room where the participant is located, the illuminance in the meeting room, the weather of the region where the participant is located, information on whether or not the speaker has an appropriate size, the time in the region where the participant is located, the date or time of the meeting, and the like. The environment of a participant 740 may be derived from environment information through a mechanical computation operation (e.g., the volume of a speaker is greater than or equal to a threshold value).

The electronic device 401 may determine one of a plurality of elements from the information obtained in operation 510 in FIG. 5, or may determine one element from other elements. For example, the electronic device 401 may judge that the emotion of a participant 730 is calmness, and may judge that the intention of a participant 720 is mere provision of information. The electronic device 401 may identify the participant from the obtained sound information, and may measure the speaking speed of the participant. The electronic device 401 may judge that the identified state of the participant corresponds to a normal state in which there is no fluctuation in the user's emotion, and may reflect the measurement result to the characteristics of the participant 710. In this case, in order to judge the characteristics of the participant 710, the intention of a participant 720, a weight 721, the emotion of a participant 730, and a weight 731 may be used.

Meanwhile, the electronic device 401 may determine another element from the one element. For example, if the speaking speed of the participant is higher than a configured characteristic value, and if the population density of the meeting room where the participant is located is higher than a reference value, the electronic device 401 may judge that the emotion of the participant 730 corresponds to excitement. In order to judge the emotion of the participant 730, the speaking speed, among the characteristics of the participant 710, a weight 713, the environment of the participant 740, and a weight 743 may be used. In other words, if the electronic device 401 judges that the participant's preference for the second subject is very low and that a request for early termination is made according to the intention of the participant, the electronic device 401 may judge that the emotion of the participant 730 corresponds to fatigue. In order to judge the emotion of the participant 730, the preference for the subject of the characteristics of the participant 710, a weight 713, the intention of the participant 720, and a weight 723 may be used.

In other words, the electronic device 401 may repeatedly make judgements without specifying the sequence thereof when judging the plurality of elements. In this case, different weights may be applied depending on the object to be judged and the component in the element for judgement of the object.

The electronic device 401 may determine a first configuration value for a characteristic of the participant 710 in order to determine the pattern 750. For example, the electronic device 401 may determine a first configuration value from the measured value of the speaking speed. Here, the first configuration value may be in inverse proportion to the measured value. The first configuration value may be a parameter value for determining the speaking time of the participant using the pattern 750.

The electronic device 401 may determine a second configuration value for the intention of a participant 720 in order to determine the pattern 750. For example, the second configuration value may be determined on the basis of the number of requests for extension of the speaking time and the extension time or the number of requests for termination of speaking and the remaining time. The electronic device 401 may produce a probabilistic distribution based on the number of requests for extension of the speaking time or the number of requests for termination of speaking during the repeated cycles. The electronic device 401 may determine the second configuration value from an expected value corresponding to the number of times the participant is expected to perform the extension request or termination request (e.g., extension request probability×extension time+termination request probability×early termination time). The second configuration value may be a parameter value for determining the speaking time of the participant using the pattern 750.

The electronic device 401 may determine a third configuration value corresponding to the emotion of the participant 730 in order to determine the pattern 750. For example, the third configuration value may correspond to an emotion level for the excitement of the participant. Here, the third configuration value may be in inverse proportion to the measured value. The third configuration value may be a parameter value for determining the speaking time using the pattern 750.

The electronic device 401 may include a fourth configuration value corresponding to the environment of a participant 740 in order to determine the pattern 750. For example, the fourth configuration value may correspond to a reservation time of the meeting room. The electronic device 401 may determine a fourth configuration value indicating information on the time at which the participant can speak, the order of speaking of the participant, and a total meeting time for the subject in which the participant takes part. The fourth configuration value may be a parameter value for determining the speaking time using the pattern 750.

The electronic device 401 may apply a first weight a, a second weight (3, a third weight y, and a fourth weight 6 to the first configuration value, the second configuration value, the third configuration value, and the fourth configuration value, respectively, thereby generating quantification information. Different weights may be applied depending on the type of pattern to be determined. For example, the weights may be varied depending on whether or not to determine a speaking time or whether or not to determine the order of speaking. The weights may be updated in order to minimize an error in the judgment through repetition of operations 510 to 550 in FIG. 5. In some embodiments, a gradient method or back propagation may be used as a method of optimizing the weights through repeated learning.

The electronic device 401 may determine the pattern 750 on the basis of the generated quantification information. Although not shown in FIG. 7, the electronic device 401 may use the quantification information of another participant, as well as the participant, thereby determining the speaking times allocated to the participant and another participant. For example, in the case where 20 minutes is allocated as the total meeting time, if the quantification information of the participant indicates "3", and if the quantification information of another participant indicates "1", the electronic device 401 may allocate a speaking time of 15 minutes to the participant, and may allocate a speaking time of 5 minutes to another participant. The quantification information may be a parameter related to time resources for allocation of the speaking time.

As described above, the elements shown in FIG. 7 may not be fixed to a specific sequence regarding the judgements. That is, the sequence of the judgements on the characteristics of the participant 710, the intentions of a participant 720, the emotions of the participant 730, and the environment of a participant 740, performed in order to determine the speaking time in the meeting, may not be specified. Therefore, it is possible to effectively determine the speaking times of the participants using the repeated learning (e.g., machine learning), instead of making judgements according to the sequential algorithm. Hereinafter, an operation in which the electronic device 401 adaptively controls a speaking time on the basis of the speaking speed, among the characteristics of a participant, will be described with reference to FIG. 8.

Figure 8:
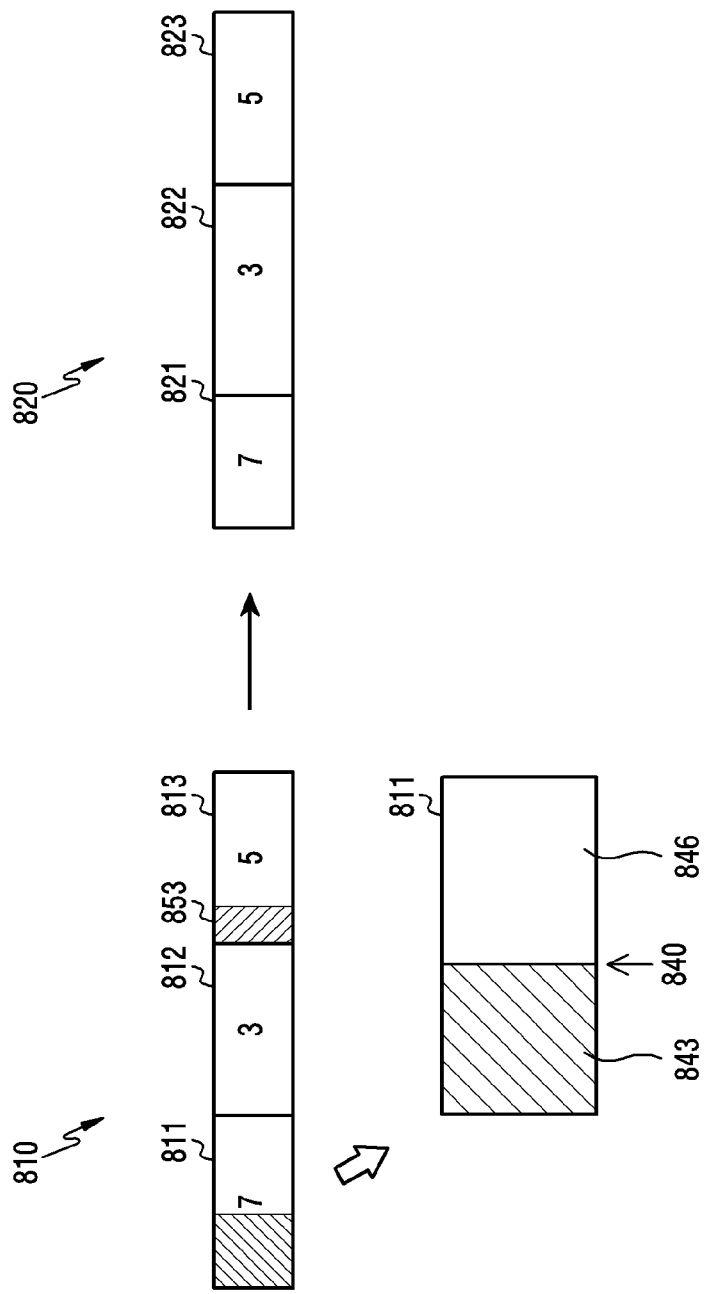
FIG. 8 illustrates an example of adaptively allocating resources depending on a speaking speed according to various embodiments of the disclosure.

FIG. 8 illustrates an example of adaptively allocating resources depending on a speaking speed according to various embodiments of the disclosure. The electronic device 401 may adaptively determine the size of a resource allocated to each participant according to the speaking speed thereof. Hereinafter, the description of FIG. 8 will be made on the basis of time resources. The allocation of time resources may be referred to as a "scheduling operation".

Referring to FIG. 8, the electronic device 401 may allocate a first time 811, a second time 812, and a third time 813 to the first user 411, the second user 412, and the third user 413, respectively, during the time interval 810 of a first meeting. The electronic device 401 may conduct the first meeting during the time interval 810. The electronic device 401 may assign the right to speak to each of the participants for the allocated time interval. The right to speak may be assigned sequentially, or may be assigned alternately according to the turn-taking between the participants. That is, it should be noted that the time interval 810 of the first meeting in FIG. 8 indicates the total amount of time resources to be allocated and that the horizontal axis of the time interval 810 of the first meeting is irrelevant to time. In this case, the total speaking time of each participant may be limited to the time allocated to each of the participants (e.g., the first time 811, the second time 812, and the third time 813) during the first meeting.

The electronic device 401 may measure the speaking speed of the first user 411 during the first meeting. The electronic device 401 may recognize spellings, syllables, words, and sentences through natural-language recognition of a voice signal of the first user 411, which is included in sound information, during the first time 811. The electronic device 401 may measure the speaking speed on the basis of the recognized spellings, syllables, words, or sentences.

The speaking speed may be defined in any of various ways. In some embodiments, the speaking speed may be defined as the number of syllables recognized for a predetermined period of time (hereinafter, referred to as a "time unit"). The electronic device 401 may identify the syllables recognized from the voice signal obtained during the first time 811, thereby determining the number of identified syllables.

In some other embodiments, the speaking speed may be defined as the number of words recognized during a time unit. The number of words may be the number of words recognized from the voice signal obtained during the first time 811, among a set of keywords related to the first subject. That is, the electronic device 401 may define the speaking speed as the number of keywords per time unit, and may measure the same, thereby using the speaking speed as a metric for determining the understanding or concentration of the participant with respect to the corresponding subject.

The electronic device 401 may generate a set of keywords related to a specific subject. Specifically, the electronic device 401 may include at least one of the words contained in the voice signals obtained during the meeting on a specific subject in the set of keywords related to the specific subject while repeating operations 510 to 550 in FIG. 5. For example, the electronic device 401 may include frequently used words, words spoken loudly, words used as objects, words having a large number of extracted keypoints, and the like in the set of keywords related to the specific subject.

In some other embodiments, the speaking speed may be defined as the number of sentences recognized during a time unit. The electronic device 401 may identify the number of sentences through natural-language recognition from the voice signal obtained during the first time 811. The electronic device 401 may identify the number of sentences by distinguishing verbs and parts of speech from the recognized natural language. In general, it may be obvious that one sentence contains one or more pieces of information. The electronic device 401 may define the speaking speed as the number of sentences per time unit, and may measure the same, thereby using the speaking speed as a metric for determining the amount of information on the subject of the participant.

In some other embodiments, the speaking speed may be defined as the number of keywords with respect to a predetermined number of sentences. Here, the keywords may mean the words included in a set of keywords related to a specific subject as described in the above embodiment. The electronic device 401 may define the speaking speed as the number of keywords with respect to a predetermined number of sentences, instead of defining the same using an arbitrary time unit, thereby using the speaking speed as metrics for determining the understanding of the participant about the corresponding subject, regardless of the actual speaking speed. Here, the predetermined number of sentences may be referred to as an "effective interval".

The electronic device 401 may measure the speaking speed of the second user 412 and the speaking speed of the third user 413 during the first meeting in the same manner as the measurement of the speaking speed of the first user 411. The electronic device 401 may determine the speaking speed of the first user 411 to be "7", the speaking speed of the second user 412 to be "3", and the speaking speed of the third user 413 to be "5". Since the speaking speed of the first user 411 is higher than those of other participants, the speaking of the first user 411 may be terminated early. Specifically, the electronic device 401 may obtain the voice signal of the first user 411 only during the time 843, among the time 811 allocated to the first user 411, and may not obtain the voice signal of the first user 411 during the time 846. Here, the time 846 may be referred to as a "remaining time" or a "remaining speaking time". If the presence of the remaining time is detected, the electronic device 401 may use the remaining time in various ways. In some embodiments, the electronic device 401 may distribute the remaining time to other participants. In this case, the distribution may be performed through an even distribution in which the remaining time is equally distributed to the respective participants or through a proportional distribution in which the remaining time is distributed to the respective participants in proportion to the times allocated thereto. In some other embodiments, the electronic device 401 may provide all of the participants with the remaining time as a break. The electronic device 401 may determine whether or not to provide the remaining time as a break on the basis of the emotion level, characteristics, and environment of each participant. Meanwhile, since the speaking speed of the second user 412 is low, the speaking of the second user 412 may exceed the allocated time 812. The electronic device 401 may block the speaking performed at the time 853, which exceeds the time allocated to the second user 412. Specifically, the electronic device 401 may turn off the microphone of the second electronic device 422 during the time 853.

The electronic device 401 may determine the speaking speed, as a characteristic of the first user 411, to be "7". The electronic device 401 may determine the speaking speed, as a characteristic of the second user 412, to be "3". The electronic device 401 may determine the speaking speed, as a characteristic of the third user 413, to be "5".

The electronic device 401 may determine the resources to be allocated to the participants in order to conduct the second meeting. The electronic device 401 may use the characteristics of the respective participants in order to conduct the second meeting. On the basis of the characteristics of the respective participants, which were determined in the first meeting, the electronic device 401 may allocate a first time 821, a second time 822, and a third time 823 to the first user 411, the second user 412, and the third user 413, respectively, during the time interval 820 of the second meeting. Specifically, the electronic device 401 may allocate the first time 821, the second time 822, and the third time 823, as the characteristics of the participant, in inverse proportion to the speaking speed of the participant. For example, the ratio of the first time 821, the second time 822, and the third time 823 may be "15:35:21 (1/7:1/3:1/5)". In some embodiments, the adjustment of the first resource of the first user and the second resource of the second user comprises changing a size of the first resource allocated to the first user from a first size to a third size; and changing a size of the second resource allocated to the second user from a second size to a fourth size. The first resource is a time allocated to the first user and the second resource is a time allocated to the second user.

As described above, the electronic device 401 may provide a meeting pattern to eliminate the imbalance that may occur between the participants using characteristics personalized for each participant.

Although FIG. 8 shows that the time resources are allocated to the entire time interval of the first meeting and then time resources are adaptively allocated to the entire time interval of the second meeting, the resources allocated to a single meeting may be adaptively adjusted. For example, if the speaking speed of the first user 411 is higher than a speaking speed configured as a characteristic of the first user 411 as a result of measurement, the electronic device 401 may configure an arbitrary cycle, and may adaptively adjust the resources allocated to the respective participants every time someone is finished speaking. In some other embodiments, if the speaking speed of the second user 412 is lower than a speaking speed configured as a characteristic of the second user 412 as a result of measurement, the electronic device 401 may configure an arbitrary cycle, and may provide the second user 412 with the resources allocated during the remaining time.

Although only time resources are described as the resources in FIG. 8, information resources or context resources may be provided to the participants according to the speaking speed. For example, the electronic device 401 may provide a notification of the current speaking speed to a participant having a relatively high speaking speed.

Figure 9:
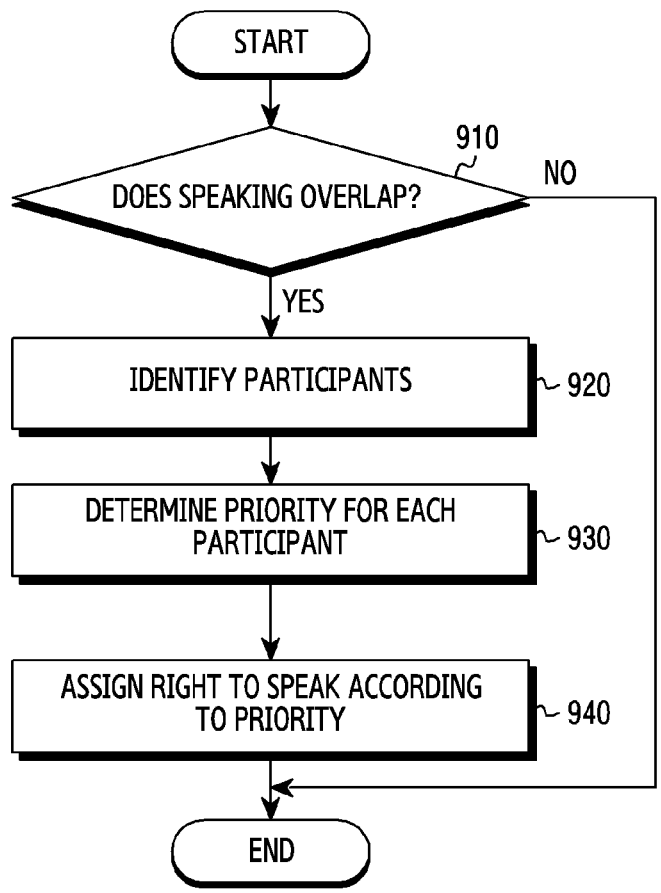
FIG. 9 is a flowchart of assigning the right to speak when simultaneous speaking occurs according to various embodiments of the disclosure.

FIG. 9 is a flowchart of assigning a right to speak when simultaneous speaking occurs according to various embodiments of the disclosure.

Referring to FIG. 9, in operation 910, the electronic device 401 may judge whether or not simultaneous speaking occurs. If voice signals of two or more participants are provided during a predetermined time interval (e.g., 5 seconds), the electronic device 401 may determine that the speaking overlaps. For example, if two or more sound waveforms of the voice signals received during the predetermined time interval overlap with each other, the electronic device 401 may determine that simultaneous speaking occurs. As another example, if voice signals of participants are input into two or more microphones during the predetermined time interval, the electronic device 401 may determine that simultaneous speaking occurs. As another example, if two or more sentences are obtained through natural-language recognition during a predetermined period of time, the electronic device 401 may determine that simultaneous speaking occurs. In this case, the voice signal of one participant may be an unexpected signal relative to the adjusted meeting pattern. If the electronic device 401 determines that simultaneous speaking has not occurred, the operations in FIG. 9 are terminated.

If simultaneous speaking occurs, the electronic device 401 may identify at least two participants in operation 920. In some embodiments, the electronic device 401 may determine that voice signals are received through the first electronic device 421 and the third electronic device 423 during the predetermined time interval. For example, the electronic device 401 may determine that the identified participants are the first user 411 and the third user 413 using the ID of the first electronic device 421 and the ID of the second electronic device 422.

In some other embodiments, the electronic device 401 may identify two or more different language usage patterns (e.g., dialects, idioms, sentence lengths, and the like) through natural-language recognition. The electronic device 401 may determine the participant corresponding to the identified language usage pattern using previously learned language usage patterns. Specifically, the electronic device 401 may compare a language usage pattern, previously learned based on a sentence or a word of a specific participant, with the identified language usage pattern. For example, the language usage pattern based on a sentence may include the number of verbs contained in one sentence, the interval between words, and the length of a sentence. As another example, the language usage pattern based on a word may include the number of syllables in a word, a correlation between words, and the percentage of keywords related to a specific subject among the words.

In some other embodiments, the electronic device 401 may identify two or more components having different shapes from among the sound information. The electronic device 401 may identify two or more sound waves from the obtained sound information on the basis of inherent sound wave shapes of the voice signals of the respective participants. The electronic device 401 may map two or more sound waves with respective ones of two or more participants on the basis of advance information (e.g., the pitch, timbre, and magnitude of a sound) or information learned in the previous cycle, thereby identifying two or more participants.

In operation 930, the electronic device 401 may determine the priority of each of the two or more identified participants.

In some embodiments, the electronic device 401 may determine the priority according to the roles of the participants. The electronic device 401 may identify the role of each of the two or more identified participants. The electronic device 401 may determine whether each of the participants is a conference host, a speaker, or a listener through predetermined user information or through natural-language recognition of the voice signals. For example, the electronic device 401 may determine the role of a participant using the number of questions asked by other participants, the number of times simultaneous speaking occurs, and the prosodic features of the speech of a participant assigned with a specific role. If the first user 411 is a conference host, the electronic device 401 may give the first user 411 a priority higher than those of other participants. If the second user 412 is a speaker, the electronic device 401 may give the second user 412 second priority after the conference host.

In some other embodiments, the electronic device 401 may determine the priority according to the remaining speaking time of each of the participants. In a debate-type meeting, it may be preferable to let a participant who has a relatively large amount of speaking time speak first for effective progress of the meeting. If the remaining speaking time of the second user 412 is more than the speaking time of the first user 411, the electronic device 401 may give the second user 412 priority higher than that of the first user 411.

In some other embodiments, the electronic device 401 may determine the priority according to the speaking speed of each of the participants. The speaking speed may be the speaking speed defined in FIG. 8. A participant having a high speaking speed may deliver a relatively large amount of information, which may be effective for the speaking of subsequent participants. In addition, as the speaking speed is increased, it may be possible to effectively provide information to all users during the same time in terms of opportunity. If the speaking speed of the first user 411 is higher than the speaking speed of the second user 412, the electronic device 401 may give priority to the first user 411.

In some other embodiments, the electronic device 401 may determine the priority of each of the participants on the basis of predetermined priority information. Here, the predetermined priority information may be priorities of participants, which are configured according to predetermined meeting types, or may be a rule made between the participants (e.g., first user 411>second user 412>third user 413, third user 413>first user 411, and the like).

In operation 940, the electronic device 401 may assign the right to speak to respective ones of two or more identified participants according to the determined priority. The electronic device 401 may preferentially give the right to speak to the participant (e.g., the first user 411) to whom a relatively high priority is assigned. If the speaking of the participant having a higher priority is terminated, the electronic device 401 may give the right to speak to the participant having the next highest priority. The electronic device 401 gives the respective participants an opportunity to speak according to the priority determined in operation 930.

Although not shown in FIG. 9, the electronic device 401 may change the order of speaking according to an arbitrary input. For example, it is assumed that the priority of the first user 411 is higher than that of the second user 412. The electronic device 401 may preferentially give the right to speak to the first user 411. In this case, the electronic device 401 may recognize a voice signal of the first user 411. The electronic device 401 may recognize a natural language "Please speak first!" from the voice signal. The electronic device 401 may judge that the first user 411 intends to pass the floor to another participant from the recognized natural language. On the basis of the judgement, the electronic device 401 may give the second user 412 the right to speak before the first user 411.

If all of the overlapping participants terminate their speaking, the electronic device 401 may terminate the operations in FIG. 9.

Figure 10:
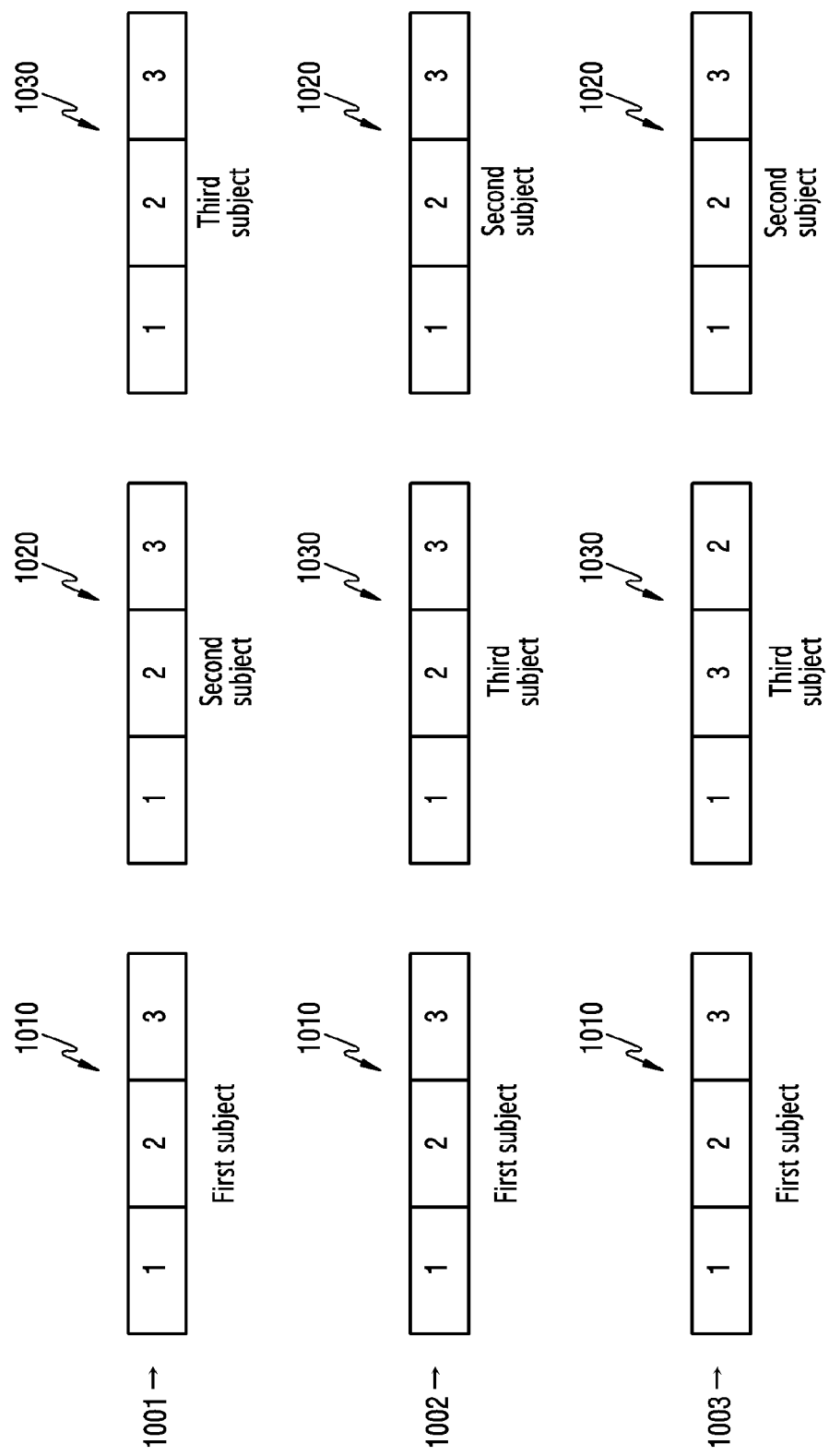
FIG. 10 illustrates an example of adaptively allocating resources depending on the subject according to various embodiments of the disclosure.

FIG. 10 illustrates an example of adaptively allocating resources depending on the subject according to various embodiments of the disclosure. Hereinafter, the resource will be described as a time resource such as a speaking time or the order of speaking. However, it is also possible to adaptively allocate information resources and context resources, as well as the time resources, depending on the subject.

Referring to FIG. 10, the electronic device 401 may allocate resources of a first time interval 1010 for a first subject, a second time interval 1020 for a second subject, and a third time interval 1030 for a third subject to the first user 411, the second user 412, and the third user 413. The meetings on the first subject, the second subject, and the third subject may be sequentially performed during the cycle 1001. The electronic device 401 may obtain sound information, image information, or environment information of respective participants during a first cycle 1001. In addition, the electronic device 401 may obtain advance information about all participants, or may obtain advance information about each of the participants during the first cycle 1001.

The electronic device 401 may judge correlations between all of the participants and subjects from the obtained information. In some embodiments, the electronic device 401 may judge that all of the participants prefer a second subject to a third subject. The preferences of all of the participants for the subjects may be determined from the emotion levels of the participants for the preferences. The electronic device 401 may process a preferred subject first, thereby facilitating efficient progress of the meeting. Since the electronic device 401 judges that the participants are more interested in the third subject than the second subject, the electronic device 401 may conduct the meeting on the third subject prior to the meeting on the second subject.

In some other embodiments, the electronic device 401 may judge that the understanding of the participants for the third subject is higher than that for the second subject. For example, the understanding may be judged using the speaking speed defined in FIG. 9. The electronic device 401 may conduct the meeting on the third subject prior to the meeting on the second subject in order to efficiently conduct the meeting.

In some other embodiments, the electronic device 401 may judge that the third subject is closely related to the first subject on the basis of information collected in the first cycle 1001. The meeting on the third subject may be conducted before the meeting on the second subject in order to process the meeting in association with the first subject. As described above, unlike in the first cycle 1001, the electronic device 401 may change the sequence of the meeting on the third subject and the meeting on the second subject according to the judgement on the characteristics, intentions, and emotions of the participants in the second cycle 1002. The electronic device 401 may conduct the meeting on the second subject later, which is relatively different. Meanwhile, the judgement on the subject sequence may be changed according to advance information or manual input. The electronic device 401 may sequentially conduct the meeting on the first subject, the meeting on the third subject, and the meeting on the second subject during the second cycle 1002.

The electronic device 401 may obtain sound information, image information, or environment information of the respective participants during the second cycle 1002. In addition, the electronic device 401 may obtain advance information about the environment in which all of the participants are located, or may obtain advance information about each of the participants during the second cycle 1002. The electronic device 401 may judge correlations between the respective participants and subjects from the obtained information. In some embodiments, the electronic device 401 may judge that the understanding of the third user 413 for the third subject is higher than that of the second user 412. The understanding may be determined on the basis of the speaking speed. The electronic device 401 may allow a participant having a high degree of understanding to speak first in the third cycle 1003, thereby inducing a debate in which subsequent participants ask questions, and may determine the third user 413 to be prior to the second user 412 in the order of speaking.

In some other embodiments, the electronic device 401 may judge that the first user 411 and the second user 412 are not friendly in connection with the third subject. For example, the electronic device 401 may determine that the first user 411 and the second user 412 are in an emotional state in the meeting on the first subject. Thus, in order to insert an interval between the speaking of the first user 411 and the speaking of the second user 412 in the subsequent meeting on the third subject, the electronic device may change the order of speaking of the third user 413 and the second user 412 in the third cycle 1003. As another example, for the third subject, the electronic device may determine that the first user 411 and the second user 412 became annoyed during the first cycle 1001 or the second cycle 1002, which is the previous cycle. In order to insert an interval between the speaking of the first user 411 and the speaking of the second user 412 in the meeting on the third subject, the electronic device may change the order of speaking of the third user 413 and the second user 412.

Although FIG. 10 shows that the sequence of subjects is determined and then the order of speakers is determined within the subject, the disclosure is not limited to the above sequence. The electronic device 401 may determine the sequence of subjects after determining the order of speakers within the subject. In addition, FIG. 10 shows that one cycle includes the meeting time for the first subject, the meeting time for the second subject, and the meeting time for the third subject, but the disclosure is not limited thereto. The respective cycles shown in FIG. 10 have been described as time intervals including all of the subjects for the convenience of explanation, and may be defined as a specific time interval. For example, the cycle may be the total time allocated to the participants for each subject, or may be the time allocated to a specific participant for a specific subject.

Figure 11:
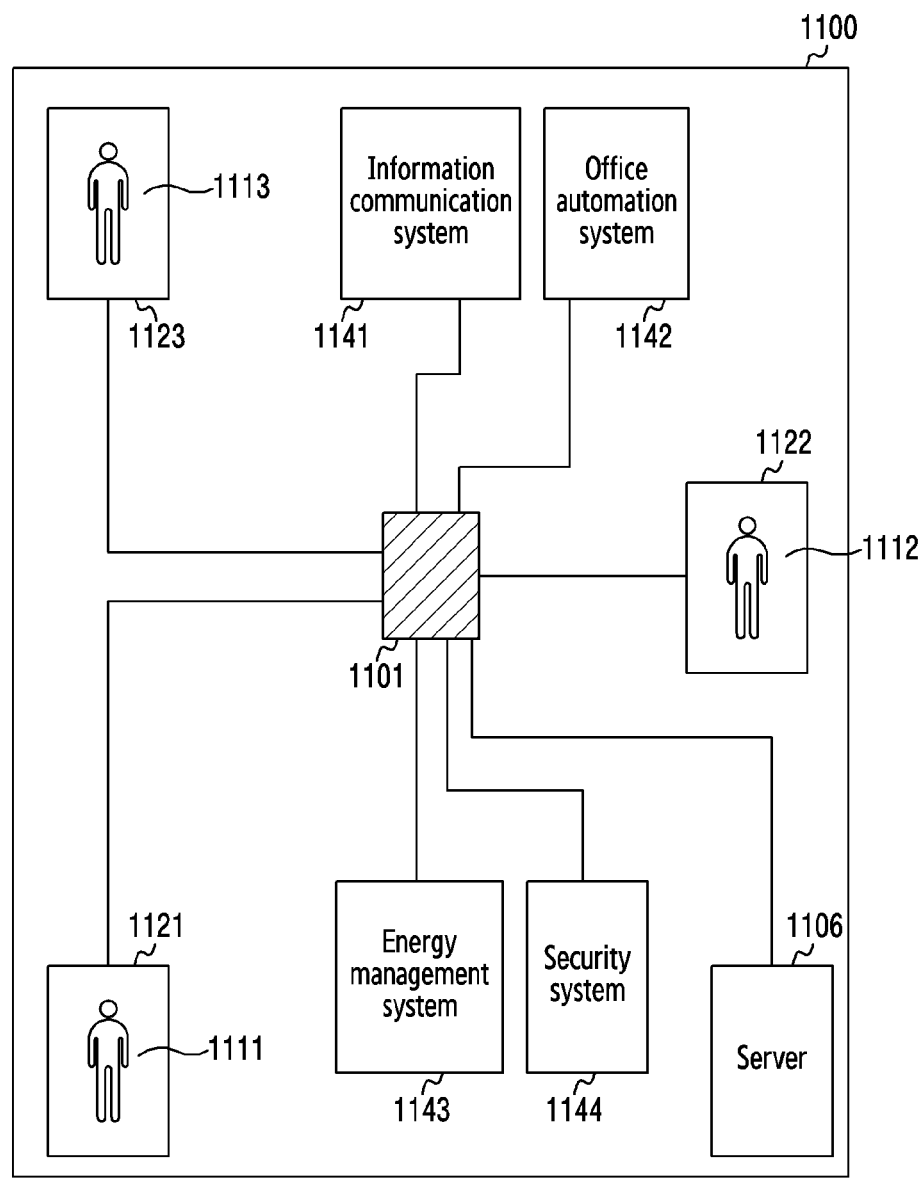
FIG. 11 illustrates an example of a smart building according to various embodiments of the disclosure.

FIG. 11 illustrates an example of a smart building according to various embodiments of the disclosure. The Smart building refers to a building in which various systems, such as an information communication system, a security system, an office automation system, an energy management system, and the like, are organically integrated, thereby providing an economical and efficient environment in a single building.

Referring to FIG. 11, the smart building 1100 may include a first meeting room 1121, a second meeting room 1122, and a third meeting room 1123. A first user 1111 may be located in the first meeting room 1121. A second user 1112 may be located in the second meeting room 1122. A third user 1113 may be located in the third meeting room 1123. The smart building 1100 may be provided with an electronic device 1101. The electronic device 1101 may be organically connected to other systems (e.g., an energy management system 1143) in the smart building 1100, and may provide an effective meeting environment to the users in the smart building 1000. The electronic device 1101 may have a configuration the same as or similar to that of the device 401 in FIG. 4. The electronic device 1101 may be connected to the first meeting room 1121, the second meeting room 1122, and the third meeting room 1123 through wired or wireless communication in order to provide a meeting environment.

The electronic device 1101 may utilize an information communication system 1141, an office automation system 1142, an energy management system 1143, and a security system 1144 while being included in the smart building 1100. In other words, the electronic device 1101 may play the role of a conference host, as a scrum master, for brainstorming. Although FIG. 11 illustrates that the smart building 1100 includes all of the information communication system 1141, the office automation system 1142, the energy management system 1143, and the security system 1144, at least some of the information communication system 1141, the office automation system 1142, the energy management system 1143, and the security system 1144 may be located in another building connected to the smart building 1100.

The electronic device 1101 may provide information about the subject of the meeting. The electronic device 1101 may transmit the subject of the meeting to be conducted to displays provided in the first meeting room 1121, the second meeting room 1122, and the third meeting room 1123 so as to be electrically connected to the electronic device 1101 through image information or to speakers provided therein through sound information. While the first user 1111 is speaking, the electronic device 1101 may monitor the second user 1112 who is another participant. For example, the electronic device 1101 may instantaneously collect image information about the second user 1112 in order to judge the emotion level, preference, and intention of the second user 1112 with respect to the first user 1111.

The electronic device 1101 may instantaneously obtain sound information, image information, and environment information, which are available in the smart building 1100.

For example, the electronic device 1001 may instantaneously obtain personalized information about users registered in the smart building 1100, users permitted to gain access, or users authenticated for meetings. The electronic device 1101 may store information instantaneously obtained in the server 1106 provided in the smart building 1100. Unlike the illustration in FIG. 11, the server 1106 may be located outside the smart building 1100 so as to be operatively connected to the electronic device 1101. The electronic device 1101 may collect, update, analyze, and store a large amount of information using the information communication system 1141, the office automation system 1142, the energy management system 1143, and the server 1106 in the smart building 1100. The electronic device 1101 may be implemented together with the smart building 1100 so as to operate organically while being connected to various systems, thereby reducing the load on the amount of data.

In some embodiments, the electronic device 1101 may obtain voice signals of the respective users in the smart building 1100. The electronic device 1101 may obtain and analyze voice signals of the respective users in the meetings related to office works (e.g., face-to-face meetings, interviews, presentations, evaluation, and the like), as well as in the configured meetings. For example, the electronic device 1101 may measure the speaking speeds of the respective users in the smart building 1100 for a predetermined period. As another example, the electronic device 1101 may repeatedly analyze the shapes of voice signals of the respective users in the smart building 1100, and may store information for identifying a specific user (e.g., a voice spectrum).

The electronic device 1101 may make a judgement on the basis of the obtained information. As described above, since the electronic device 1101 is able to collect, analyze, and store all of the information on the smart building 1100, the electronic device 1101 may use a large amount of training data. The electronic device 1101 may perform a judgement based on probabilities and weights from a number of pieces of training data and repeated operation in the multiple judgements (e.g., hierarchical judgments, recursive judgments, and the like) as described with reference to FIGS. 6 and 7. If an error in the judgement is detected, or if there is a requirement for a specific judgement, the electronic device 1101 may immediately identify the same. For example, if information about another user in the smart building 1100 is required in addition to the participants in the meeting, the electronic device 1101 may immediately obtain the required information using various elements in the smart building 1100 (e.g., the information communication system 1141, the office automation system 1142, the server 1106, and the like). The electronic device 1101 may recognize the requirement from the voice signal of a speaker, and may make a request for the requirement through the electronic device in the place where another user is located.

If an integrated meeting is required after the parallel meetings are conducted, the electronic device 1101 may efficiently allocate a total time. The electronic device 1101 may provide a first meeting environment to a group A so as to conduct a meeting on the first subject. The electronic device 1101 may provide a second meeting environment to a group B so as to conduct a meeting on the second subject. Here, the group A and the group B may contain different users. When the meeting on the first subject and the meeting on the second subject are finished, the electronic device 1101 may provide a third meeting environment to the group A and the group B so as to conduct a meeting on the third subject. The electronic device 1101 may integrate learning results of the judgements on the characteristics, emotions, and intentions of the respective users in the group A, which are obtained during the meeting on the first subject, and learning results of the judgements on the characteristics, emotions, and intentions of the respective users in the group B, which are obtained during the meeting on the second subject, thereby determining a meeting pattern in the third meeting environment.

The electronic device 1101 may efficiently control the context resources. In some embodiments, the electronic device 1101 may judge that the first user 1111 feels uncomfortable in the first meeting room 1121 on the basis of a temperature value included in the environment information. The electronic device 1101 may provide another meeting room (e.g., the second meeting room 1122) to the first user 1111. In some other embodiments, the electronic device 1101 may judge that the second user 1112 is dazzled by the lighting in the second meeting room 1122 on the basis of a change in the facial expression of the second user 1112, which is included in the image information. The electronic device 1101 may reduce the illuminance in the second meeting room 1122.

The electronic device 1101 may also determine power resources as a pattern for conducting the meeting. The electronic device 1101 may control the power to be supplied to the meeting rooms where the respective users are located using the energy management system 1143. For example, the electronic device 1101 may distribute limited power resources according to the characteristics of the participants in the meeting. As another example, the electronic device 1101 may determine the power resources to be provided to the meeting on the basis of the number of participants in the meeting and the number of users who do not participate in the meeting in the smart building 1000. The power resources may include the illuminance, the rental time of the meeting room, the size of provided data, the time of provided data, or the total meeting time.

The electronic device 1101 may present a subject that is not mentioned by the user. The electronic device 1101 may identify a subject that was not mentioned in another meeting or a subject that was not mentioned by the conference host. In some embodiments, if the third user 1113 is a conference host, the electronic device 1101 may assign an identifier for identifying the subjects to each meeting on the subject to be discussed. In this case, the participants in each meeting on the subject to be discussed may include other users, excluding the third user 1113. The electronic device 1101 may identify the third user 1113 who is a conference host, and may then provide a notification message of a subject not having an identifier for identifying the subjects.

Figure 12:
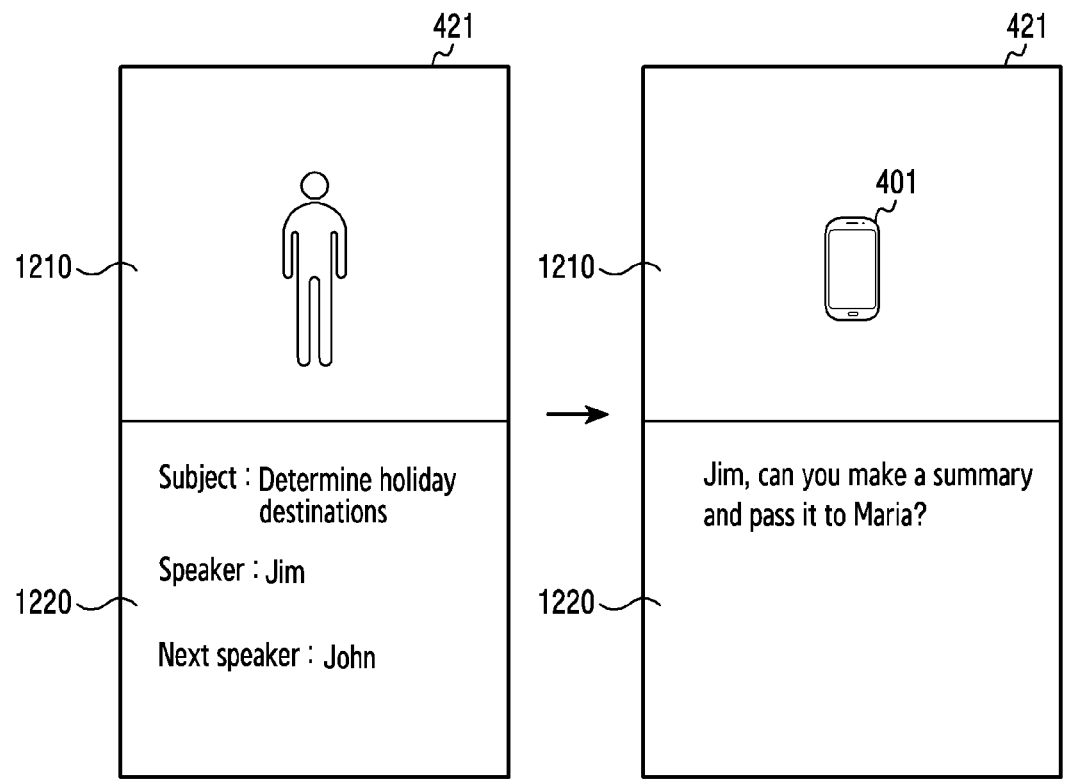
FIG. 12 illustrates an example of a user interface (UI) provided to a user device according to various embodiments of the disclosure.

FIG. 12 illustrates an example of a user interface (UI) provided to a user device according to various embodiments of the disclosure. The device may be one of the first electronic device 421, the second electronic device 422, or the third electronic device 423 in FIG. 4. Hereinafter, a description will be made on the basis of the first electronic device 421.

Referring to FIG. 12, the first electronic device 421 may include a first area 1210 and a second area 1220. The first area 1210 and the second area 1220 may be views obtained by dividing one UI into two areas, or may be views provided by two UIs, respectively.

The first electronic device 421 may provide image information through the first area 1210. The image information may be image information about a participant who is speaking (e.g., the second user 412). The image information may be image information containing a real-time image of a participant who is speaking or image information including an image (e.g., a profile image) pre-stored in connection with a participant who is speaking. Although FIG. 12 shows that the first electronic device 421 displays, through the first area, image information about a participant who is speaking, the disclosure is not limited thereto. The first electronic device 421 may display, through the first area, information (e.g., a document file) provided by a participant who is speaking.

The first electronic device 421 may display, through the second area 1220, information about the meeting that is in progress. The information about the meeting may include at least one piece of information about the subject of the meeting, information about the participant who is speaking (hereinafter, referred to as a "speaker"), information about a participant who is going to speak next, information on the remaining time of the current speaker, information on the total meeting time, information about the subjects to be discussed at the meeting, information on the speaking speed of a speaker, or information about the utterance of the speaker. For example, the information about the subject of the meeting may include the purpose of the meeting (e.g., determination of a holiday destination). Here, the information on the subject of the meeting may be predetermined by the participants, or may be determined on the basis of a natural language obtained from a voice signal of a speaker. The information of the current speaker may be the name of the current speaker (e.g., Jim). The information of a participant who is going to speak next may be the name of the next speaker (e.g., John).

If the speaking of the second user 412 is terminated, the electronic device 401 may give a speaking opportunity (the right to speak) to the first user 411. As the right to speak is given to the first user 411, the first electronic device 421 may provide another view. The first electronic device 421 may provide a view of the first user 411, or may provide a view of the electronic device 401 through the first area 1210.

The first user 411 may make a new speech. The first electronic device 421 may obtain a voice signal from the speech of the first user 411. The first electronic device 421 may transmit the voice signal to the electronic device 401. If the first electronic device 421 is not provided with a microphone, the electronic device 401 may directly obtain a voice signal from the first user 411. The electronic device 401 may recognize a natural language "Jim, can you make a summary and pass it to Maria?" from the voice signal. The electronic device 401 may transmit the recognized natural language to the first electronic device 421. If the first electronic device 421 includes a natural-language recognition module, the first electronic device 421 may directly obtain the natural language of the speech of the first user 411 without signaling with the electronic device 401. The first electronic device 421 may display the obtained natural language in the second area 1220.

Although not shown in FIG. 12, the electronic device 401 may extract the word "Jim" from the recognized natural language, and may identify the second user 412 corresponding thereto. The electronic device 401 may assign the right to speak to the second user 412 so as to give a response to the question from the first user 411.

In some embodiments, the first electronic device 421 may operate in a silent mode. The electronic device 401 may indirectly transmit the speech by displaying and recognizing text with respect to the first electronic device 421 without using a voice signal or natural-language recognition. The first electronic device 421 may display the obtained text through the area 1220, or may transmit the obtained text to another participant through a separate input device. The electronic device 401 may include a text recognition module for conducting a meeting with the first electronic device 421. In some embodiments, natural-language generation (NLU) may be performed in the process of transmitting text to other participants. By the natural-language generation, the electronic device 401 may operate in a human-like manner, so that participants may participate in the meeting in an easy and natural manner.

As described with reference to FIGS. 1 to 12, the electronic device 401 may adaptively determine a meeting pattern using information personalized for each user, and may provide the determined pattern, thereby providing an optimal meeting environment to the participants in the meeting. In addition, the electronic device 401 may adjust resources in order to eliminate the imbalance between users by integrating personalized information of respective users, and may provide notification of omissible information, thereby providing an efficient meeting environment.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclo-

What is claimed:

1. A method for operating a device, the method comprising:
allocating a first resource to a first user and a second resource to a second user based on first information for the first user and second information for the second user;
obtaining third information for the first user through at least part of the allocated first resource;
determining a speaking speed of the first user based on the obtained third information; and
adjusting the first resource and the second resource based on the speaking speed of the first user and the second information,
wherein the first resource and the second resource are associated with a meeting,
wherein the first information includes at least one of sound information for the first user, image information for the first user, or environment information for the first user, and
wherein the second information includes at least one of sound information for the second user, image information for the second user, or environment information for the second user.

2. The method of claim 1, wherein the adjusting the first resource and the second resource comprises:
identifying the first user from among a plurality of users based on the obtained third information;
modifying the speaking speed of the first user by comparing the first information with the obtained third information; and
adjusting the first resource and the second resource based on the modified speaking speed of the first user,
wherein the obtained third information comprises at least one of a voice signal of the first user, an identifier of the first user, or an image containing the first user.

3. The method of claim 1,
wherein the first resource is a time period allocated to the first user and the second resource is a time period allocated to the second user.

4. The method of claim 3, wherein the speaking speed of the first user is determined based on a number of valid words in a voice signal of the first user per time unit, and
wherein the valid words are included in a set of words related to a subject of the meeting configured by the device.

5. The method of claim 1, wherein the adjusting the first resource and the second resource comprises:
determining a probability of each of a plurality of candidate states for a meeting pattern of the first user based on the obtained third information; and
adjusting the first resource and the second resource based on the probability of each of the plurality of candidate states of the meeting pattern,
wherein the meeting pattern is associated with at least one of a speaker time of the first user during the meeting, a total period of the meeting, an order of speaking for the meeting, or an allocation of additional speak time.

6. The method of claim 5, wherein the adjusting the first resource and the second resource comprises:
determining a configuration value of the meeting pattern based on each of the plurality of candidate states according to the obtained third information; and
determining a weight according to the configuration value of each of the plurality of candidate states,
wherein the configuration value is determined according to a type of the first resource and a type of the second resource.

7. The method of claim 6, wherein the adjusting the first resource and the second resource comprises:
determining a first parameter of the first user by multiplying the configuration value of each of the plurality of candidate states by the weight of each of the plurality of candidate states;
determining a second parameter of the second user based on the third information and the second information; and
adjusting the first resource and the second resource in proportion to the first parameter and the second parameter.

8. The method of claim 1, further comprising:
if a voice signal of the first user overlaps a voice signal of a third user during a predetermined period of time, determining an order of speaking of the first user and the third user according to a priority of the first user and a priority of the third user; and
allocating resources to the first user or the third user according to the determined order of speaking.

9. The method of claim 1, further comprising:
updating training data for an artificial intelligence (AI) algorithm based on an amount of change of the adjusted first and second resources,
wherein the first information and the third information correspond to a first parameter for determining a meeting pattern using the AI algorithm, and
wherein the second information corresponds to a second parameter for the determining the meeting pattern using the AI algorithm.

10. The method of claim 9, wherein at least one of a first weight applied to the first parameter or a second weight applied to the second parameter is changed based on the amount of change of the adjusted first and second resources.

11. A device comprising:
a display configured to provide a user with allocated resources; and
at least one processor configured to:
allocate a first resource to a first user and a second resource to a second user based on first information for the first user and second information for the second user;
obtain third information for the first user through at least part of the allocated first resource;
determine a speaking speed of the first user based on the obtained third information; and
adjust the first resource and the second resource based on the speaking speed of the first user and the second information,
wherein the first resource and the second resource are associated with a meeting,
wherein the first information includes at least one of sound information for the first user, image information for the first user, and environment information for the first user, and
wherein the second information includes at least one of sound information for the second user, image information for the second user, or environment information for the second user.

12. The device of claim 11, wherein the at least one processor is, in order to adjust the first resource and the second resource, configured to:

identify the first user from among a plurality of users based on the obtained third information;

modify the speaking speed of the first user by comparing the first information with the obtained third information; and adjust the first resource and the second resource based on the modified speaking speed of the first user, wherein the obtained third information comprises at least one of a voice signal of the first user, an identifier of the first user, or an image containing the first user.

13. The device of claim 11, wherein the first resource is a time period allocated to the first user and the second resource is a time period allocated to the second user.

14. The device of claim 13, wherein the speaking speed of the first user is determined based on a number of valid words in a voice signal of the first user per time unit, and wherein the valid words are included in a set of words related to a subject of the meeting configured by the device.

15. The device of claim 11, wherein the at least one processor is, in order to adjust the first resource and the second resource, configured to:

determine a probability of each of a plurality of candidate states for a meeting pattern of the first user based on the obtained third information; and adjust the first resource and the second resource based on the probability of each of the plurality of candidate states of the meeting pattern, wherein the meeting pattern is associated with at least one of a speaker time of the first user during the meeting, a total period of the meeting, an order of speaking for the meeting, or an allocation of additional speak time.

16. The device of claim 15, wherein the at least one processor is, in order to adjust the first resource and the second resource, configured to:

determine a configuration value of the meeting pattern based on each of the plurality of candidate states according to the obtained third information; and determine a weight according to the configuration value of each of the plurality of candidate states, wherein the configuration value is determined according to a type of the first resource and a type of the second resource.

17. The device of claim 16, wherein the at least one processor is, in order to adjust the first resource and the second resource, configured to:

determine a first parameter of the first user by multiplying the configuration value of each of the plurality of candidate states by the weight of each of the plurality of candidate states;

determine a second parameter of the second user based on the third information and the second information; and adjust the first resource and the second resource in proportion to the first parameter and the second parameter.

18. The device of claim 11, wherein the at least one processor is further configured to:

if a voice signal of the first user overlaps a voice signal of a third user during a predetermined period of time, determine an order of speaking of the first user and the third user according to a priority of the first user and a priority of the third user; and allocate resources to the first user or the third user according to the determined order of speaking.

19. The device of claim 11, wherein the at least one processor is further configured to:

update training data for an artificial intelligence (AI) algorithm based on an amount of change of the adjusted first and second resources, wherein the first information and the third information correspond to a first parameter for determining a meeting pattern using the AI algorithm, and wherein the second information corresponds to a second parameter for the determining the meeting pattern using the AI algorithm.

20. The device of claim 19, wherein at least one of a first weight applied to the first parameter or a second weight applied to the second parameter is changed based on the amount of change of the adjusted first and second resources.

* * * * *